(12) United States Patent
Amano et al.

(10) Patent No.: US 8,049,822 B2
(45) Date of Patent: Nov. 1, 2011

(54) PROJECTION TYPE VIDEO DISPLAY

(75) Inventors: Ryuhei Amano, Osaka (JP); Yoshihiro Yokote, Osaka (JP); Hideyuki Kanayama, Kyoto (JP); Kazuhiro Arai, Osaka (JP); Takashi Ikeda, Osaka (JP); Takashi Miwa, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 1283 days.

(21) Appl. No.: 11/710,992

(22) Filed: Feb. 27, 2007

(65) Prior Publication Data
US 2007/0201006 A1    Aug. 30, 2007

(30) Foreign Application Priority Data

Feb. 27, 2006  (JP) .................................. 2006-051323
Feb. 27, 2006  (JP) .................................. 2006-051324
Feb. 27, 2006  (JP) .................................. 2006-051325
Feb. 27, 2006  (JP) .................................. 2006-051326

(51) Int. Cl.
   *H04N 9/31*   (2006.01)
(52) U.S. Cl. ........ 348/744; 348/746; 348/750; 348/756; 348/758; 348/806; 353/30; 353/69
(58) Field of Classification Search ................. 348/744, 348/746, 750, 756, 757, 758, 759, 806, 807; 353/30, 31, 69; 349/8, 5
See application file for complete search history.

(56) References Cited

U.S. PATENT DOCUMENTS
5,795,047 A * 8/1998 Sannohe et al. ................ 353/81

FOREIGN PATENT DOCUMENTS
| JP | 2003-078842 | 3/2003 |
| JP | 2003315916 | 11/2003 |
| JP | 2004-245956 | 9/2004 |
| WO | WO 2005/116719 A2 | 8/2005 |

* cited by examiner

*Primary Examiner* — Michael Lee
*Assistant Examiner* — Jean W Desir
(74) *Attorney, Agent, or Firm* — McDermott Will & Emery LLP

(57) ABSTRACT

There are provided a write light valve for generating image-writing light by modulating write light, a driver for writing images into the write light valve based on image data, read light valves for each color for generating respective color image lights by modulating each received color illumination light, an imaging lens group for guiding the image-writing light emitted from the write light valve to the respective read light valves, a dichroic cube for combining together color image lights emitted from the respective read light valves, a projection lens for projecting each color image light combined together. The imaging lens group has a distortion aberration which reduces or cancels out a distortion aberration of the projection lens.

13 Claims, 18 Drawing Sheets

FIRST IMAGE FORMATION PLANE

PROJECTION TYPE VIDEO DISPLAY

CROSS REFERENCE TO RELATED APPLICATIONS

This application is based upon and the benefit of priority from prior Japanese Patent Applications No. 2006-051323, No. 2006-051324, No. 2006-051325 and No. 2006-051326 filed on Feb. 27, 2006, the entire contents of which are incorporated herein by reference.

BACKGROUND OF THE INVENTION

1. Field of the Invention

The present invention relates to a projection type video display in which an image writing to a read light valve that generates projection image light is performed by using light.

2. Description of the Related Art

A projection type video display in which an image writing to a read light valve which generates projection image light is performed by using light is known (refer to a pamphlet of International Laid-Open WO 2005/116719 and Japanese Unexamined Patent Application Publication No. 2004-94115, for example). As an example, a conventional projection type video display is shown in FIG. 1. White light emitted from a white light source 101 is converted to substantially parallel light by a parabolic reflector, and the parallel light is introduced into an integrator lens 102. The integrator lens 102 is constructed by a pair of fly's eye lenses 102a and 102b and each of pairs of lens parts leads light emitted from the white light source 101 to the whole surface of a read light valve described later. Light that has passed through the integrator lens 102 is introduced into a first dichroic mirror 105 after passing through a polarization converter 103 and a collective lens 104.

The polarization converter 103 is constructed by a polarization beam splitter array (hereinbelow, referred to as PBS array). Each of PBSs has polarization separation films and a retardation film (1/2λ plate). Each of the polarization separation films in the PBS transmits, for example, P-polarized light in light from the integrator lens 102 and changes the optical path of S-polarized light by 90°. The S-polarized light whose optical path is changed is reflected by the adjoining polarization film and goes out as it is. On the other hand, the P-polarized light which has passed through the polarization separation film provided on the front side (light-exit side) of the PBS is converted to S-polarized light by the retardation film and the S-polarized light goes out. That is, in this case, substantially all of light is converted to S-polarized light.

A first dichroic mirror 105 transmits first color light while reflecting second color light and third color light. The first color light which has passed through the first dichroic mirror 105 is reflected by a tilted reflecting mirror 106. The first color light reflected by the tilted reflecting mirror 106 is introduced into a transmission-type read light valve 131 for first color light via a lens 107. The first color light changes to first color image light as a result of passing through the read light valve 131. On the other hand, light reflected by the first dichroic mirror 105 is introduced into a second dichroic mirror 108.

The second dichroic mirror 108 transmits third color light while reflecting second color light. The second color light reflected by the second dichroic mirror 108 is introduced into a transmission-type read light valve 132 for second color light via a lens 109. The second color light changes to second color image light as a result of passing through the read light valve 132.

A first dichroic cube 112 is provided at a position where an optical path of the first color image light and an optical path of the second color image light cross each other. The first dichroic cube 112 transmits the first color light while reflecting the second color light. When the first color image light and the second color image light are incident on the first dichroic cube 112, they are directed to the same direction.

The third color light which has passed through the second dichroic mirror 108 is introduced into a transmission-type read light valve 133 for third color light via a lens 110. The third color light changes to third color image light as a result of passing through the read light valve 133. An optical path of the third color image light is changed by 90° by a reflecting prism 111.

A second dichroic cube 113 is provided at a position where the changed optical path of the third color image light and an optical path which is the optical path of the first color image light combined with the optical path of the second color image light cross each other. The second dichroic cube 113 transmits the first color light and the second color light while reflecting the third color light. When the first color image light, the second color image light and the third color image light are incident on the second dichroic cube 113, they are directed to the same direction. This causes full-color image light to be generated.

At the light exit side of the second dichroic cube 113 (beside a surface which emits the full-color image light), there is disposed a projection lens 114. The full-color image light emitted from the second dichroic cube 113 is projected onto a not-shown screen through the projection lens 114.

Next, an image writing optical system will be described hereinafter. The image writing optical system includes three UV (Ultraviolet)-LEDs (light-emitting diodes) 121A, 121B and 121C as image-writing light sources for respective colors. The peak wavelength of the UV-LEDs 121A, 121B and 121C are different from one another. UV-LEDs 121A, 121B and 121C are turned on in a time-sequential manner. UV lights emitted from UV-LEDs 121A, 121B and 121C are directed to the same direction by dichroic mirrors 120A and 120B. When the UV lights pass through a rod integrator 122, a surface illuminant with a uniform light intensity is formed on an exit surface of the rod integrator 122. The UV lights emitted from the exit surface are introduced into a polarization beam splitter 124 after passing through a relay lens group 123.

Particular polarized light (for example, P-polarized light) which has passed through the polarization beam splitter 124 is introduced into a write light valve (for example, LCOS (liquid-crystal-on-silicon) device) 125 which modulates write light (the UV light). The write light valve 125 generates images for respective colors in a time-sequential manner by a not-shown driver. That is, the driver causes the write light valve 125 to form a first image based on a first color video signal when the UV-LED 121A is turned on, next writes a second image into the write light valve 125 based on a second color video signal when the UV-LED 121B is turned on, and writes a third image into the write light valve 125 based on a third color video signal when the UV-LED 121C is turned on, for example.

The write light valve 125 generates image light by modulating the received particular polarized light. The image light is obtained as reflected light, and the reflected light is changed to the other particular polarized light (for example, S-polarized light). That is, when the particular polarized light is irradiated on the write light valve 125, image-writing light having the other particular polarized light (S-polarized light) is generated. The image-writing light emitted from the write light valve 125 is reflected on the polarization beam splitter 124. The image-writing light is introduced into the second dichroic cube 113 through an imaging lens group 126.

Each of the second dichroic cube 113 and the first dichroic cube 112 has wavelength selectivity for the UV lights from the UV-LEDs 121A, 121B and 121C. Three UV lights having different peak-wavelengths from are split, and the split lights (the aforementioned image-writing lights) are introduced into the respective read light valves 131, 132 and 133. Specifically, first image-writing light based on the first color video signal is irradiated on the read light valve 131, second image-writing light based on the second color video signal is irradiated on the read light valve 132, and third image-writing light based on the third color video signal is irradiated on the read light valve 133.

As disclosed in the pamphlet of International Laid-Open WO 2005/116719, each of the read light valves 131, 132 and 133 is composed of an OASLM (Optically Addressed Spatial Light Modulator) having a photoconductive effect. For example, with a configuration in which a liquid crystal layer is interposed between optically transparent electrode structures having a photoconductive effect, photoconductive effect changes in only its portion where light is irradiated, with the result that a state of application of a voltage to the liquid crystal changes in the portion where light is irradiated, changing a state of rotation of the liquid crystal.

The conventional projection type video display described above, particularly the projection type video display shown in FIG. 1, however, needs a large projection lens having a long back focal length. In a case where the projection lens is particularly designed in wide-angle lens specifications, a distortion aberration is likely to occur. Further, in a case where a chromatic aberration of magnification occurs in a projection optical system, a color blur may occur in a projected image on a screen.

SUMMARY OF THE INVENTION

An object of the present invention is to provide a projection type video display which enables to reduce inconvenience due to an optical cause, in a projection type video display in which an image writing to a read light valve which generates projection image light is performed by using light.

A projection type video display according to the present invention includes a write light valve for generating image-writing light by modulating write light; a driver for writing images into the write light valve based on image data; read light valves for each color, in which an image is written by the image-writing light emitted from the write light valve, for generating respective color image lights by modulating received color illumination lights; a writing optical system for guiding the image-writing light emitted from the write light valve to the respective read light valves; means for combining together the color image lights emitted from the respective read light valves; and a projection optical system for projecting each of the color image lights combined together, wherein the writing optical system has a distortion aberration which reduces or cancels out a distortion aberration of the projection optical system.

With the aforementioned projection type video display, since the writing optical system has the distortion aberration which reduces or cancels out the distortion aberration of the projection optical system, a projection image whose distortion is reduced is obtained, even if where the distortion aberration is likely to occur due to the necessity of providing a large projection lens having a long back focal length and also because the projection lens is particularly designed with wide-angle lens specifications.

In the projection type video display, a pincushion distortion may occur in a projection image projected through the projection optical system, and a barrel distortion may occur in the image-writing light in the writing optical system. Alternatively, in the projection type video display, a barrel distortion may occur in the projection image projected through the projection optical system, and a pincushion distortion may occur in the image-writing light in the writing optical system.

A projection type video display according to the present invention includes a write light valve for generating image-writing light by modulating write light; a driver for writing images into the write light valve based on image data; read light valves for each color, in which an image is written by the image-writing light emitted from the write light valve, for generating respective color image lights by modulating received color illumination lights; a writing optical system for guiding the image-writing light emitted from the write light valve to the respective read light valves; means for combining together the color image lights emitted from the respective read light valves; and a projection optical system for projecting each of the color image lights combined together, wherein the sizes of the written images on the respective read light valves are different from one another due to the write lights having different peak-wavelengths, with the result that a difference in size between color projected images on a screen is reduced due to the occurrence of a chromatic aberration of magnification in the projection optical system.

With the aforementioned projection type video display, since the sizes of the written images on the respective read light valves are different from one another due to the write lights having different peak-wavelengths, with the result that the difference in size between the color projected images on the screen is reduced due to the occurrence of the chromatic aberration of magnification in the projection optical system. Therefore, the color blur in the projected image on the screen is reduced even if the chromatic aberration of magnification occurs in the projection optical system. Further, a difficulty in a design for reducing the chromatic aberration of magnification needed in the projection optical system is also reduced.

The aforementioned projection type video display may be configured such that on the condition that the peak-wavelength of each write light is denoted by $\lambda 1$, $\lambda 2$, $\lambda 3$ ($\lambda 1 > \lambda 2 > \lambda 3$) and the wavelength of each color illumination light is denoted by $\lambda 11$, $\lambda 12$, $\lambda 13$ ($\lambda 11 < \lambda 12 < \lambda 13$), an image writing using the write light with the wavelength $\lambda 1$ is performed when the color illumination light with the wavelength $\lambda 11$ is incident on the read light valve, an image writing using the write light with the wavelength $\lambda 2$ is performed when the color illumination light with the wavelength $\lambda 12$ is incident on the read light valve, and an image writing using the write light with the wavelength $\lambda 3$ is performed when the color illumination light with the wavelength $\lambda 13$ is incident on the read light valve.

It is preferable that the aforementioned driver adjusts the position of the image for each color which is written into the write light valve based on a given position adjustment amount. With the projection type video display having the aforementioned driver, since the position of the image for each color which is written into the write light valve can be adjusted by the aforementioned driver, convergence can be adjusted even if a shift of the position and a shift of the attitude of the elements which compose the optical system occur.

It is preferable that the aforementioned driver adjusts the size of the image for each color which is written into the write light valve based on a given size adjustment amount. With the projection type video display having the aforementioned driver, since the size of the image for each color which is written into the write light valve can be adjusted by the aforementioned driver, a color blur occurring in the projected image on a screen is reduced even if the chromatic aberration of magnification occurs in the projection optical system. Further, a difficulty in a design for reducing the chromatic aberration of magnification needed in the projection optical system is also reduced.

It is preferable that the projection type video display includes a shift device for shifting the write light valve or the writing optical system up-and-down and/or right-and-left in a plane perpendicular to an optical axis of the image writing. With the projection type video display having the aforementioned shift device, the write light valve or the writing optical system is shifted up and down and/or right and left in the plane perpendicular to the optical axis of the image-writing, thereby obtaining a mechanism which shifts the projection image without moving the body of the display without increasing in size, weight and cost of the display.

It is preferable that the projection type video display includes a shift instruction operation portion to which a signal indicating a shift is inputted by an user operation, wherein the aforementioned driver adjusts the position of the image for each color which is written into the write light valve based on the signal indicating the shift. With the projection type video display having the aforementioned driver, the driver adjusts the position of the image for each color which is written into the write light valve based on the signal indicating the shift, thereby obtaining a mechanism which shifts the projection image without moving the body of the display without increasing in size, weight and cost of the display.

A projection type video display according to the present invention includes a write light valve for generating image-writing light by modulating write light; a driver for writing images into the write light valve based on image data; a single read light valve, in which images are written by the image-writing lights emitted from the write light valve, for generating respective color image lights by modulating received color illumination lights; a writing optical system for guiding the image-writing light emitted from the write light valve to the read light valve; and a projection optical system for projecting the image light emitted from the read light valve, wherein the writing optical system has a distortion aberration which reduces or cancels out a distortion aberration of the projection optical system.

With the aforementioned projection type video display, a configuration using a single transmission-type read light valve is realized. Further, since the writing optical system has the distortion aberration which reduces or cancels out the distortion aberration of the projection optical system, a projected image whose distortion is reduced is obtained even if the distortion aberration is likely to occur due to the necessity of a large projection lens having a long back focal length and also because the projection lens is particularly designed with wide-angle lens specifications.

A projection type video display according to the present invention includes a write light valve for generating image-writing light by modulating write light; a driver for writing images into the write light valve based on image data; a single read light valve, in which images are written by the image-writing lights emitted from the write light valve, for generating respective color image lights by modulating received color illumination lights; a writing optical system for guiding the image-writing light emitted from the write light valve to the read light valve; and a projection optical system for projecting the image light emitted from the read light valve, wherein the sizes of the written images on the read light valve are different from one another due to the write light having different peak-wavelengths, with the result that a difference in size between the color projected images on a screen is reduced due to the occurrence of the chromatic aberration of magnification in the projection optical system.

With the aforementioned projection type video display, a configuration using a single transmission-type read light valve is realized. Further, the sizes of the written images on the read light valve are different from one another due to the write lights having different peak-wavelengths, with the result that a difference in size between the color projected images on the screen is reduced due to the occurrence of the chromatic aberration of magnification in the projection optical system. Thereby, a color blur in the projected image on the screen is reduced even if the chromatic aberration of magnification occurs in the projection optical system. Further, a difficulty in a design for reducing the chromatic aberration of magnification needed in the projection optical system is also reduced.

The aforementioned projection type video display may be configured such that on the condition that the peak-wavelength of each write light is denoted by $\lambda 1$, $\lambda 2$, $\lambda 3$ ($\lambda 1 > \lambda 2 > \lambda 3$) and the wavelength of each color illumination light is denoted by $\lambda 11$, $\lambda 12$, $\lambda 13$ ($\lambda 11 < \lambda 12 < \lambda 13$), an image writing using the write light with the wavelength $\lambda 1$ is performed when the color illumination light with the wavelength $\lambda 11$ is incident on the read light valve, an image writing using the write light with the wavelength $\lambda 2$ is performed when the color illumination light with the wavelength $\lambda 12$ is incident on the read light valve, and an image writing using the write light with the wavelength $\lambda 3$ is performed when the color illumination light with the wavelength $\lambda 13$ is incident on the read light valve.

The projection type video display having the aforementioned single read light valve may further include a polarization beam splitter and an optical member for introducing the image-writing light emitted from the write light valve to the read light valve and for introducing each color image light emitted from the read light valve to the projection optical system, wherein the write light is introduced into the write light valve after passing through the polarization beam splitter, and the image-writing light is changed into particular polarized light, and is returned to the polarization beam splitter, and the returned image-writing light is reflected on the polarization beam splitter and is introduced into the optical member after passing through the writing optical system.

It is preferable that the projection type video display having the aforementioned single read light valve further includes an optical member for introducing the image-writing light emitted from the write light valve to the read light valve and for introducing each color image light emitted from the read light valve to the projection optical system, wherein the write light is introduced into the write light valve after passing through the optical member and the writing optical system, and the image-writing light is introduced into the read light valve after passing through the writing optical system and the optical member. With the aforementioned projection type video display, it is possible to eliminate the necessity of the polarization beam splitter.

It is preferable that the projection type video display having the aforementioned single read light valve further includes an optical member for leading the image-writing light emitted from the write light valve to the read light valve and for leading each color image light emitted from the read light valve to the projection optical system, wherein the write light is introduced into the write light valve after passing through the optical member, and the image-writing light emitted from the write light valve is introduced into the read light valve through the writing optical system after changing its optical path by the optical member, and each color image light is introduced into the projection optical system after passing through the writing optical system and the optical member, wherein an image formation plane of each color image light is formed between the projection optical system and the optical member. With the aforementioned projection type video display, since the image formation plane of each color image light is formed between the projection optical system and the optical member, it is possible to use a small-size projection lens whose back focus is shortened as the projection optical system.

It is preferable that the projection type video display having the aforementioned single read light valve further includes a shift device for shifting the write light valve or the writing optical system up and down and/or right and left in a plane perpendicular to an optical axis of image-writing. With the projection type video display having the aforementioned shift device, the write light valve or the writing optical system is shifted up and down and/or right and left in the plane perpendicular to the optical axis of the image-writing, thereby obtaining a mechanism which shifts the projection image without moving the body of the display without increasing in size weight and cost of the display.

It is preferable that the projection type video display having the aforementioned single read light valve further includes a shift instruction operation portion to which a signal indicating a shift is inputted by an user operation, wherein the aforementioned driver adjusts the position of the image for each color which is written into the write light valve based on the signal indicating the shift. With the projection type video display having the aforementioned driver, the driver adjusts the position of the image for each color which is written into the write light valve based on the signal indicating the shift, thereby obtaining a mechanism which shifts the projection image without moving the body of the display without increasing in size, weight and cost of the display.

As described above, according to the present invention, it is possible to provide a projection type video display which enables to reduce inconvenience due to an optical cause, in a projection type video display in which an image writing to a read light valve which generates projection image light is performed by using light.

The above and other objects, features, modes, and advantages of the present invention will become clear from the following detailed description with reference to the attached drawings.

DETAILED DESCRIPTION OF THE EMBODIMENTS

Configuration of a Projection Type Video Display of an Embodiment

Hereinafter, with reference to FIGS. 2 to 20, an embodiment of a projection type video display (projector) 50 according to the present invention will be described.

Figure 1:
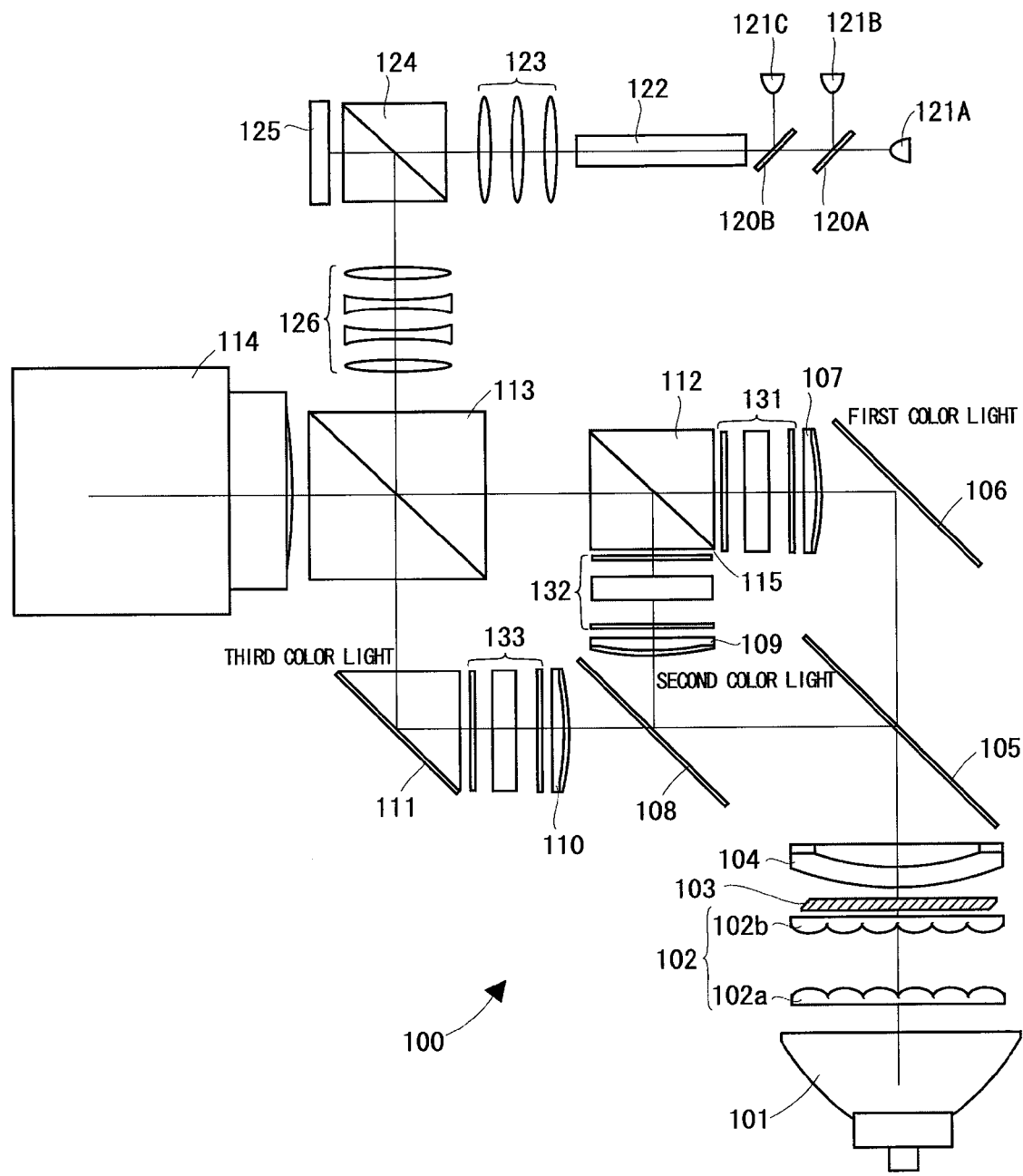
FIG. 1 is an explanation view illustrating an optical system in a conventional projection type video display.
Figure 2:
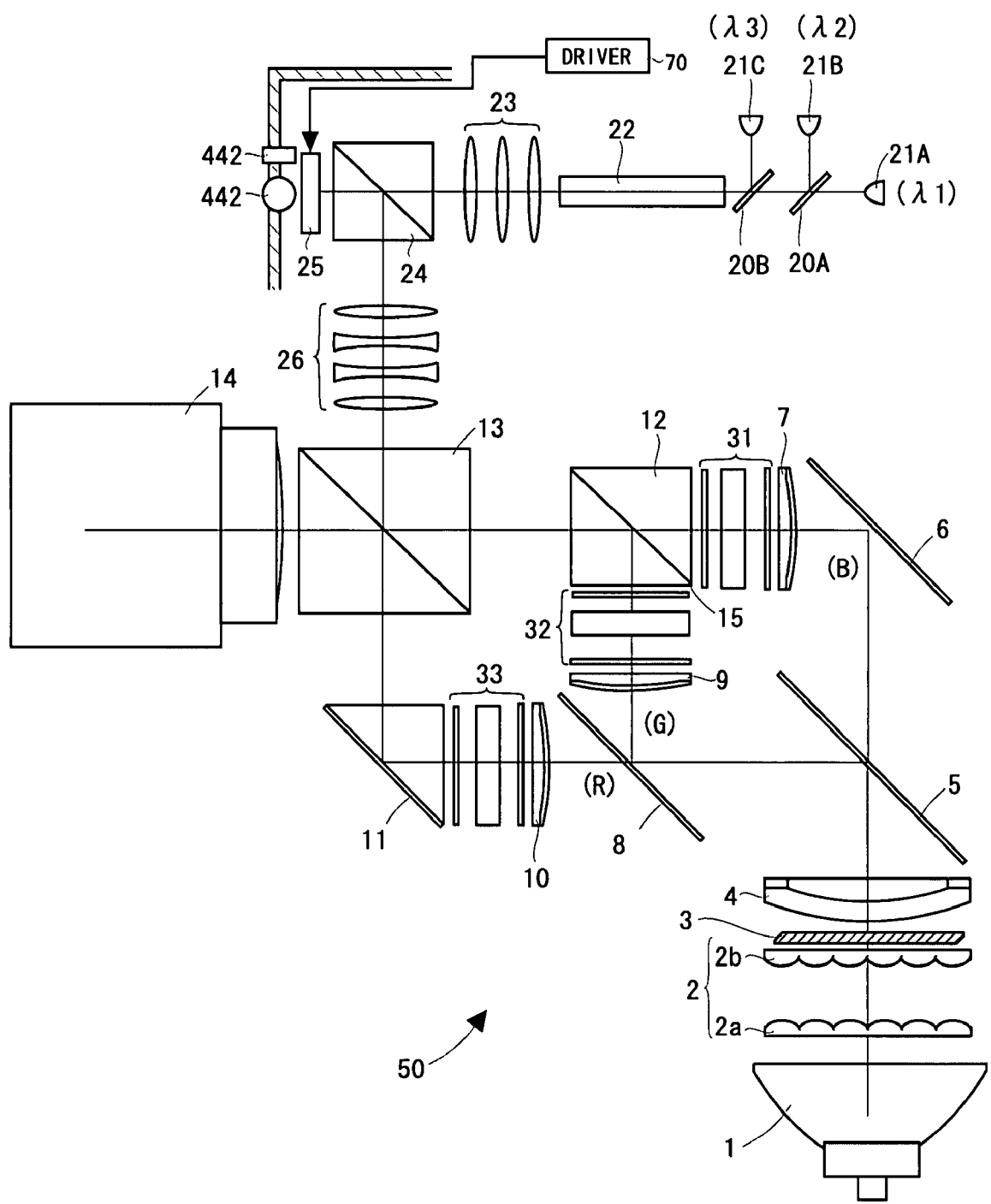
FIG. 2 is an explanation view illustrating an optical system in a projection type video display according to an embodiment of the present invention.

FIG. 2 shows a projection type video display according to the present embodiment. White light emitted from a white light source 1 is converted to substantially parallel light by a parabolic reflector, and the parallel light is introduced into an integrator lens 2. The integrator lens 2 is constructed by a pair of fly's eye lenses 2a, 2b and each of the pairs of lens parts introduces light emitted from the white light source 1 to the whole surface of a read light valve described later. Light which goes out via the integrator lens 2 is introduced into a first dichroic mirror 5 after passing through a polarization converter 3 and a collective lens 4.

The polarization converter 3 is constructed by a polarization beam splitter array (hereinbelow, referred to as PBS array). Each of PBSs has polarization separation films and a retardation film (1/2λ plate). Each of the polarization separation films in the PBS transmits, for example, P-polarized light in the light from the integrator lens 2 and changes the optical path of S-polarized light by 90°. The S-polarized light whose optical path is changed is reflected by the adjoining polarization film and goes out as it is. On the other hand, the P-polarized light which has passed through the polarization separation film is converted to S-polarized light by the retardation film provided on the front side (light-exit side) of the PBS and the S-polarized light goes out. That is, in this case, substantially all of light is converted to S-polarized light.

A first dichroic mirror 5 transmits blue color light while reflecting green color light and red color light. The blue color light which has passed through the first dichroic mirror 5 is reflected by a tilted reflecting mirror 6. The blue color light reflected on the tilted reflecting mirror 6 is introduced into a transmission-type read light valve 31 for blue color light via a lens 7. The blue color light changes to blue color image light as a result of passing through the read light valve 31. On the other hand, light reflected by the first dichroic mirror 5 is introduced into a second dichroic mirror 8.

The second dichroic mirror 8 transmits red color light while reflecting green color light. The green color light reflected on the second dichroic mirror 8 is introduced into a transmission-type read light valve 32 for green color light via a lens 9. The green color light changes to green color image light as a result of passing through the read light valve 32.

A first dichroic cube 12 is provided at a position where an optical path of the first color image light and an optical path of the second color image light cross each other. The first dichroic cube 12 transmits the blue color light while reflecting the green color light. When the blue color image light and the green color image light are incident on the first dichroic cube 12, they are directed to the same direction. This causes cyan color image light to be generated.

The red color light which has passed through the second dichroic mirror 8 is introduced into a transmission-type read light valve 33 for red color light via a lens 10. The red color light changes to red color image light as a result of passing through the read light valve 33. An optical path of the red color image light is changed by 90° through a reflecting prism 11.

A second dichroic cube 13 is provided at a position where the changed optical path of the red color image light and an optical path of the cyan color image light cross each other. The second dichroic cube 13 transmits the blue color light and the green color light while reflecting the red color light. When the cyan color image light and the red color image light are incident on the second dichroic cube 13, they are directed to the same direction. This causes full-color image light to be generated.

At the light exit side of the second dichroic cube 13 (beside a surface which emits the full-color image light), there is provided a projection lens 14. The full-color image light emitted from the second dichroic cube 13 is projected onto a not-shown screen through the projection lens 14.

Next, an image writing optical system will be described hereinbelow. The image writing optical system includes three UV (Ultraviolet)-LEDs (light-emitting diode) 21A, 21B and 21C as image-writing light sources for respective colors. The UV-LEDs 21A, 21B and 21C are different from one another in peak wavelengths ($\lambda 1 > \lambda 2 > \lambda 3$). The UV-LEDs 21A, 21B and 21C are turned on in a time-sequential manner. UV lights emitted from the UV-LEDs 21A, 21B and 21C are introduced into the same direction by dichroic mirrors 20A and 20B. When the UV lights pass through a rod integrator 22, a surface illuminant with a uniform light intensity is formed on an exit surface of the rod integrator 22. The UV lights emitted from the exit surface are introduced into a polarization beam splitter 24 after passing through a relay lens group 23.

Particular polarized light (for example, P-polarized light) which has passed through the polarization beam splitter 24 is directed to a write light valve (for example, LCOS (liquid-crystal-on-silicon) device) 25 which modulates write lights (the UV lights). The write light valve 25 generates images for respective colors in a time-sequential manner with a driver 70. That is, the driver 70 writes a blue image into the write light valve 25 based on a blue color video signal when the UV-LED 21A is turned on, writes a green image into the write light valve 25 based on a green color video signal when the UV-LED 21B is turned on, and writes a red image into the write light valve 25 based on a red color video signal when the UV-LED 21C is turned on, for example.

The write light valve 25 generates image light by modulating the received particular polarized light. The image light is obtained as reflected light, and the reflected light is changed into the other particular polarized light (for example, S-polarized light). That is, when the particular polarized light is irradiated onto the write light valve 25, image-writing light having the other particular polarized light (S-polarized light) is generated. The image-writing light emitted from the write light valve 25 is reflected on the polarization beam splitter 24. The image-writing light is introduced into the second dichroic cube 13 through an imaging lens group 26.

Each of the second dichroic cube 13 and the first dichroic cube 12 has wavelength selectivity for the UV lights from the UV-LEDs 21A, 21B and 21C. Three UV lights having different peak-wavelengths are split, and split lights (the aforementioned image-writing lights) are introduced into the respective read light valves 31, 32 and 33. Specifically, first image-writing light based on the blue color video signal is directed to the read light valve 31, second image-writing light based on the green color video signal is directed to the read light valve 32, and third image-writing light based on the red color video signal is directed to the read light valve 33.

As disclosed in the pamphlet of International Laid-Open WO 2005/116719, each of the read light valves 31, 32 and 33 is composed of an OASLM (Optically Addressed Spatial Light Modulator) having a photoconductive effect. For example, with a configuration in which a liquid crystal layer is interposed between optically transparent electrode structures having a photoconductive effect, photoconductive effect changes in only its portion where light is irradiated, with the result that a state of application of a voltage to the liquid crystal changes in the portion where light is irradiated, changing a state of rotation of the liquid crystal. In each of the read light valves 31, 32 and 33, a so-called pixel-electrode is unnecessary. It can be said that pixels in the read light valves appear when optical writing is performed.

(Configuration for Reducing Distortion)

Figure 3A:
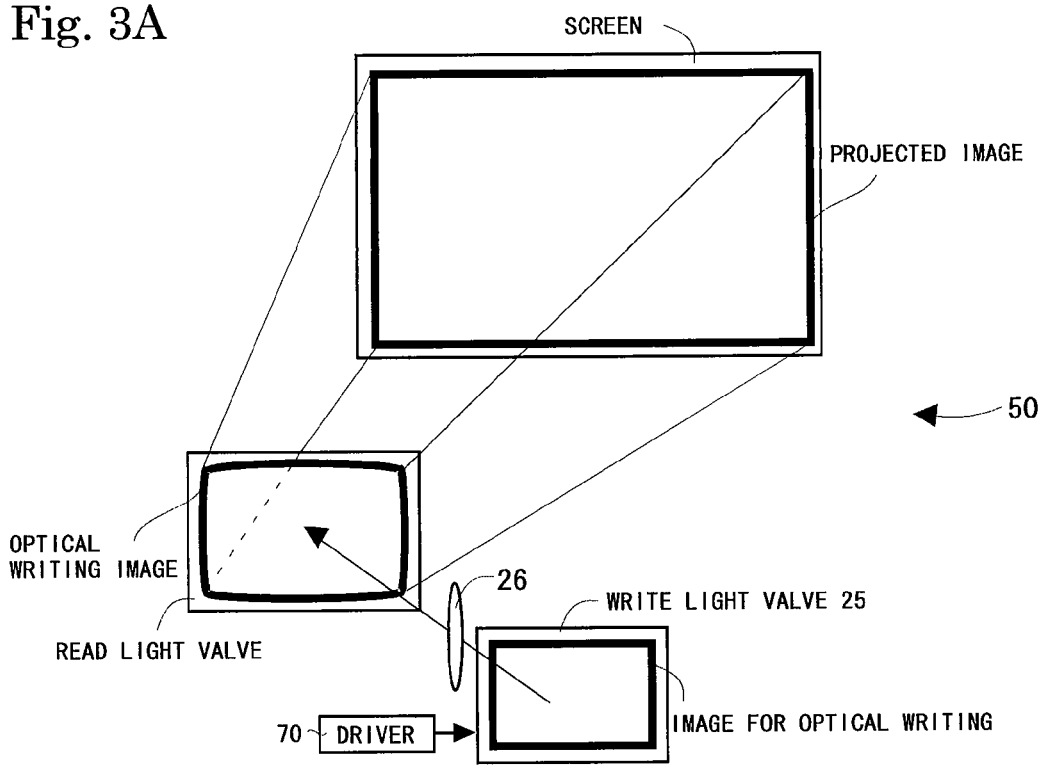
FIG. 3A is an explanation view showing a situation where a quadrangle shape image written into a write light valve is written into read light valves, and the written images by using light on these read light valves are projected on a screen.

Next, a configuration which enables to reduce inconvenience (a distortion of a projected image, a chromatic aberration of magnification of the projected image) due to an optical cause, in a projection type video display in which an image writing to a read light valve which generates projection image light is performed by using light, will be described. FIG. 3A shows a situation where a quadrangle shape image written into the write light valve 25 is written into the read light valves 31, 32 and 33 through the imaging lens group 26 and the written images by using light on these read light valves are projected on a screen. It should be noted that for comparison purposes, FIG. 3B shows the same situation in the conventional projection type video display 100.

Figure 3B:
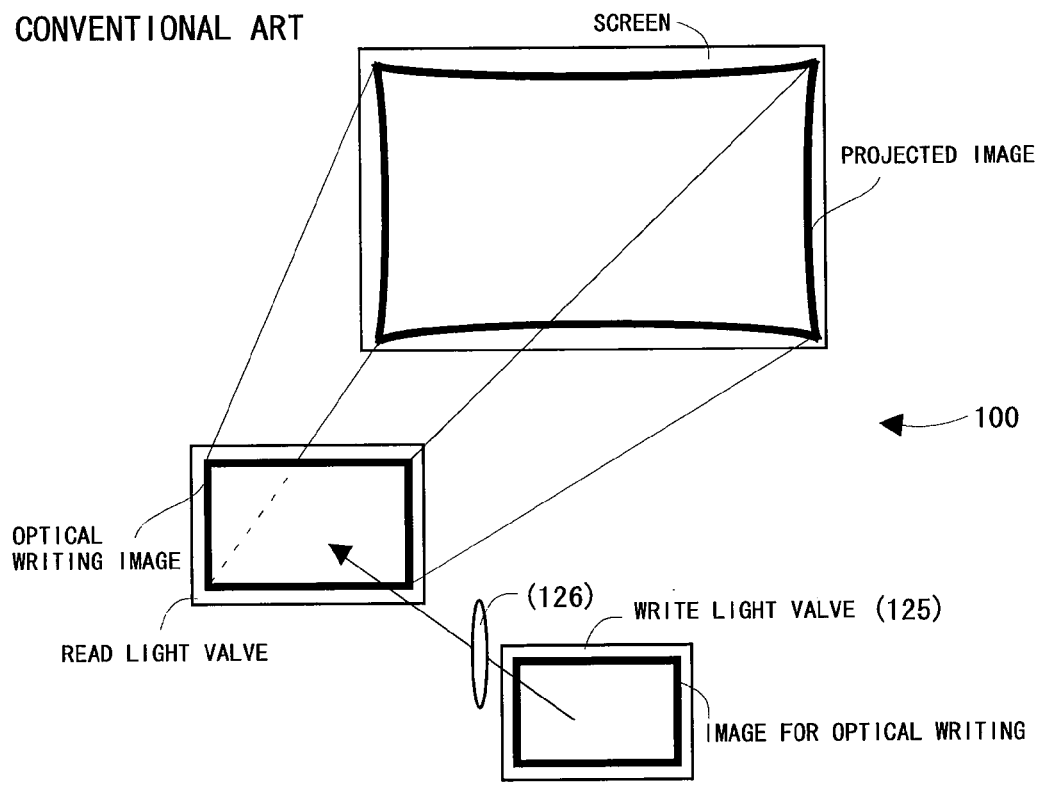
FIG. 3B is an explanation view showing the same situation in a conventional projection type video display, for comparison purposes.

In the conventional projection type video display 100, as shown in FIG. 3B, the quadrangle shape image written into the write light valve (125) is written into the read light valve without being distorted through the imaging lens group(126). However, the written image by using light on the read light valve is distorted when it is projected due to the distortion aberration of the projection lens (114) and has a pincushion distortion on the screen. On the other hand, in the projection type video display according to the present invention, the quadrangle shape image written into the write light valve 25 is written into the read light valve with the image distorted in a barrel shape by the imaging lens group 26. And then the written image by using light on the read light valve is distorted when projected due to the distortion aberration of the projection lens 14 and changes to a quadrangle shape on the screen.

Although, a distortionless lens is usually used as the relay lens group, the distortionless lens is not used as the imaging lens group 26 in the projection type video display 50 according to the embodiment. That is, the distortion aberration is caused to occur in the imaging lens group 26 intentionally. The distortion aberration of the imaging lens group 26 is in a relation reverse to the distortion aberration of the projection lens 14. Specifically, the projection lens 14 distorts an image so that the quadrangle shape image changes to a pincushion shape, while the imaging lens group 26 distorts an image so that the quadrangle shape image changes to a barrel shape. That is, the imaging lens group 26 is optically designed so that the quadrangle shape image is deformed into the barrel shape. The degree of distortion of the imaging lens group 26 is set depending on the degree of distortion aberration of the projection lens. It should be noted that the barrel distortion may occur in the projected image projected through the projection lens 14, and the pincushion distortion may occur in the image-writing light in the imaging lens group 26.

Figure 14A:
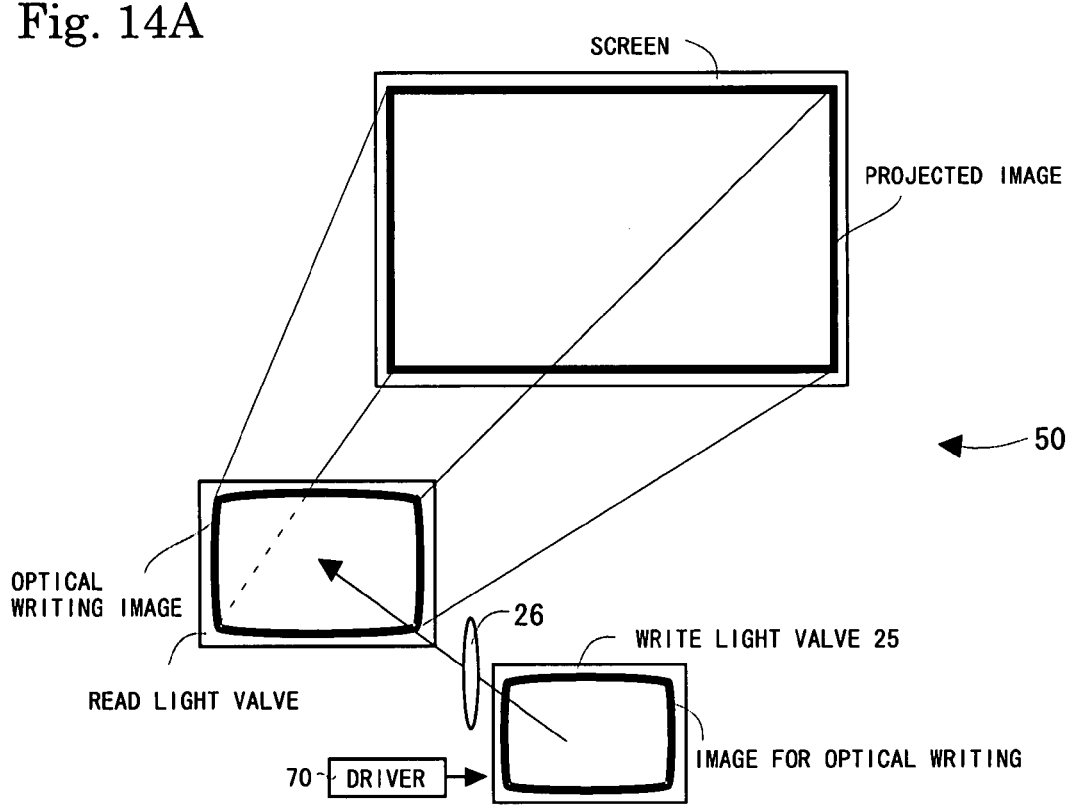
FIG. 14A is an explanation view showing a situation where a barrel shape image written into a write light valve is written into read light valves, and the written image (the barrel shape) using light on each of the read light valves is projected in a quadrangle shape on a screen.

Here, an image processing circuit in the driver may distort the image in a barrel shape when the image is written into the write light valve (see FIG. 14A). In the above-described embodiment, the image processing circuit is unnecessary.

Figure 4A:
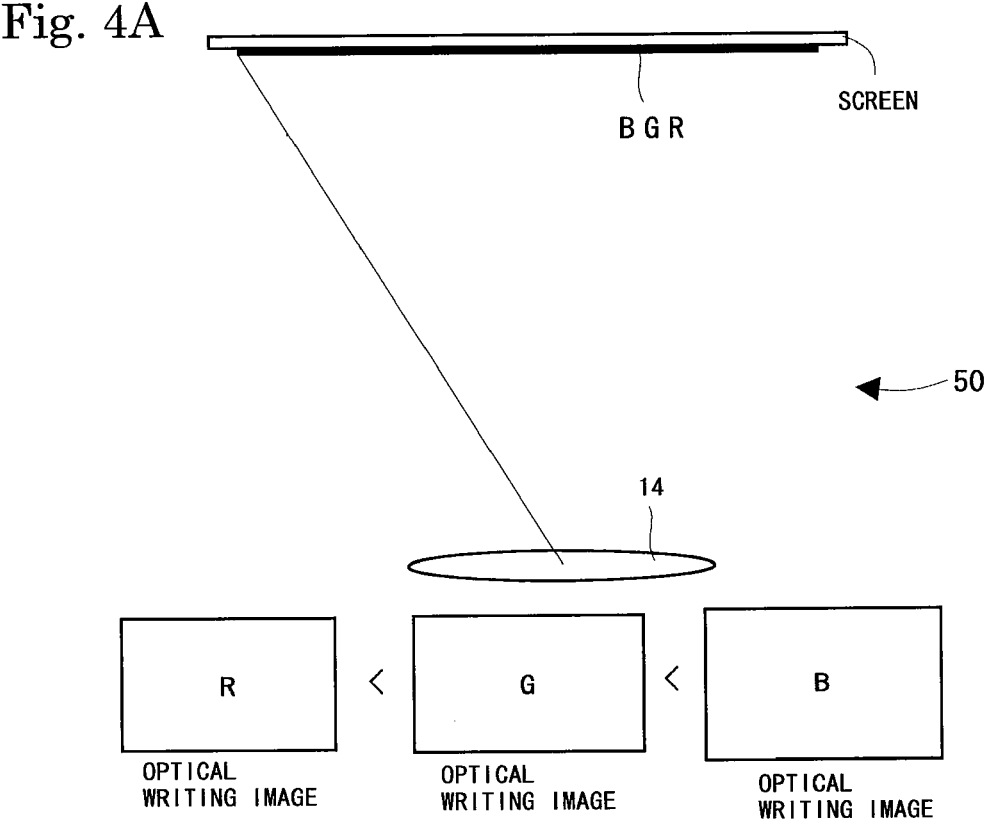
FIG. 4A is an explanation view showing a situation where written images by using light on read light valves are projected on a screen.
Figure 4B:
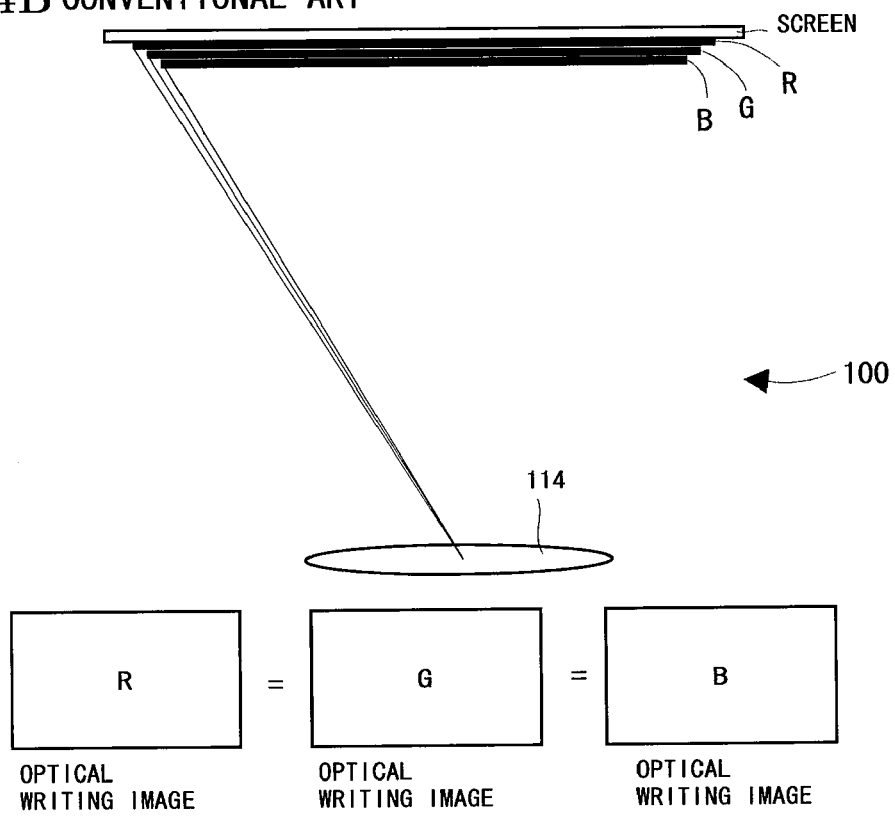
FIG. 4B is an explanation view showing the same situation in a conventional projection type video display, for comparison purposes.

FIG. 4A shows a situation where the written images by using light on the read light valves 31, 32 and 33 are projected on the screen. It should be noted that for comparison purposes, FIG. 4B shows the same situation in the conventional projection type video display 100. It is assumed that the projection lens 14 (114) has a high chromatic aberration of magnification. In this case, in a case where the sizes of the written images by using light on the read light valves are the same as shown FIG. 4B, color projected images on the screen are different from one another in size. Specifically, in a case where the center of a blue color wavelength is denoted by $\lambda 11$, the center of a green color wavelength is denoted by $\lambda 12$ and the center of a red color wavelength is denoted by $\lambda 13$, a relationship of $\lambda 11 < \lambda 12 < \lambda 13$ is satisfied. Therefore, a red color image is the largest image, a blue color image is the smallest image, and a green color image is intermediate in size therebetween due to a chromatic aberration of magnification.

In the projection type video display 50 according to the present invention, it is defined properly which of the color images is to be written by choosing which of these UV-LEDs is to be used. That is, when a wavelength of light of image is longer, the display 50 selects write light (UV) with shorter wavelength in the image-writing. As described above, the peak wavelengths of the UV-LEDs 21A, 21B and 21C are different from one another ($\lambda 1 > \lambda 2 > \lambda 3$). Further, as to color illumination lights, a relationship of $\lambda 11 < \lambda 12 < \lambda 13$ is satisfied. Under the aforementioned condition, the image-writing to the read light valve 31 on which the color illumination light with the wavelength $\lambda 11$ (blue color) is incident is performed with the write light of the LED 21A, the image-writing to the read light valve 32 on which the color illumination light with the wavelength $\lambda 12$ (green color) is incident is performed with the write light of the LED 21B, the image-writing to the read light valve 33 on which the color illumination light with the wavelength $\lambda 13$ (red color) is incident is performed with the write light of the LED 21C. Accordingly, as shown in FIG. 4A, the order of the sizes of the written images by using light is a blue color image, a green color image, and a red color image, thus reducing the effect of the chromatic aberration of magnification of the projection lens 14. In other words, with the aforementioned configuration, when an optics design for correcting the chromatic aberration of magnification in the projection lens 14 is done, the degree of correction of the chromatic aberration of magnification is reduced, thus improving the degree of freedom in a design of the projection lens 14. It should be noted that depending on a combination of lenses in the projection lens 14(114), there is a case where a blue color image is the largest, a red color image is the smallest, a green color image is intermediate in size therebetween. In this case, when a wavelength of light of image is longer, the display 50 selects write light (UV) with longer wavelength in the image-writing.

Figure 15:
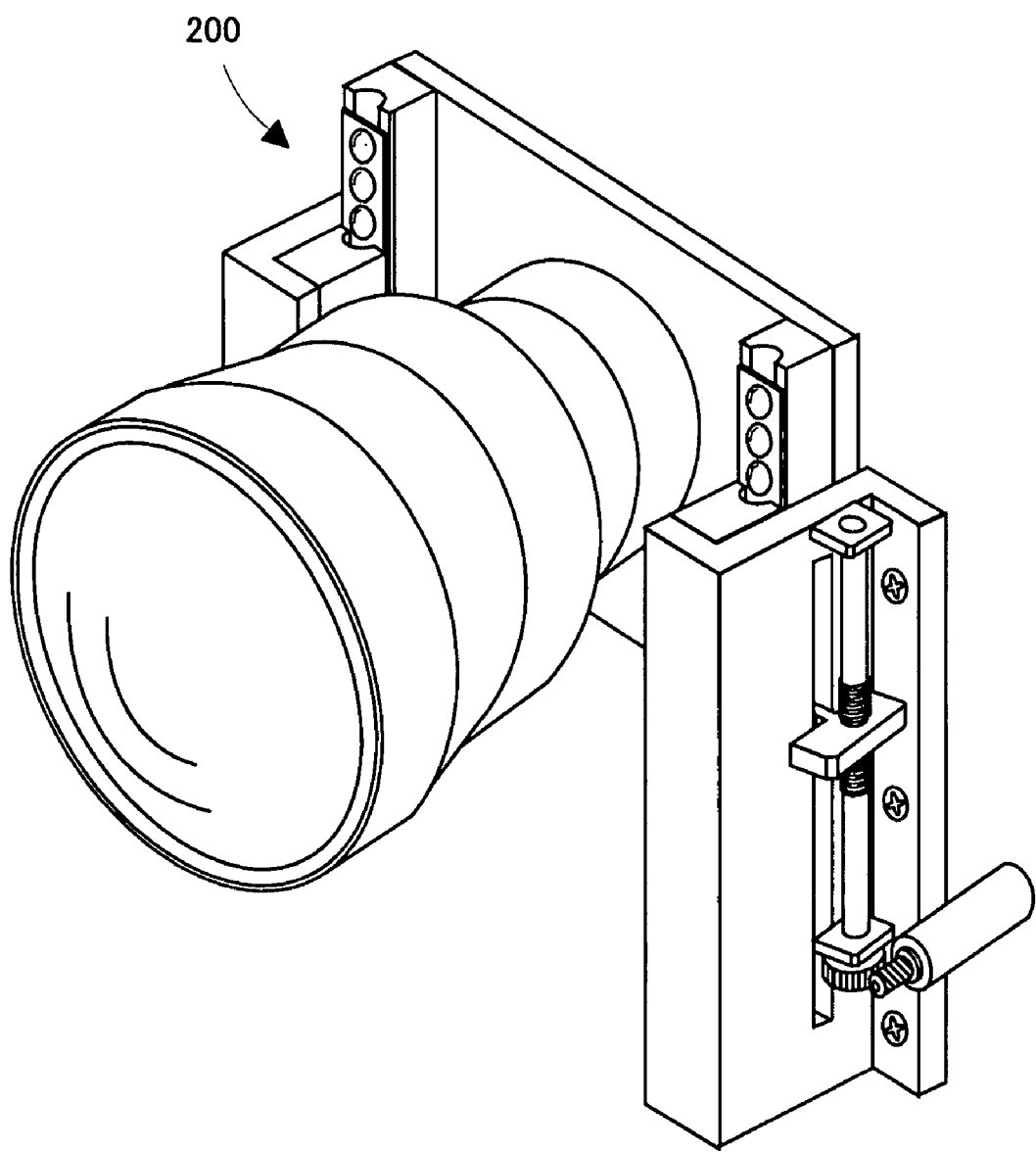
FIG. 15 is a perspective view illustrating a conventional lens shift device.

It should be noted that the optical system shown in FIG. 2 is an example, and a configuration in which three UV lights whose wavelengths are different from one another are emitted by switching irradiation by using a single UV-LED can be adopted (see FIG. 15 in the pamphlet of International Laid-Open WO 2005/116719). Further, a configuration comprising a dichroic X cube which combines three color image lights together and a dichroic cube (for introducing the write light) which is placed between the dichroic X cube and the projection lens is known (see FIG. 16 in the pamphlet of WO2005/116719). It this configuration, it can be considered that the above-described distortion-reduction configuration is especially effective. That is, in a configuration in which two cubes are disposed adjoining each other at the light incidence side of the projection lens for combining of each color image and for introducing of write lights, for example (also see FIGS. 17A and 17B in the pamphlet of International Laid-Open WO 2005/116719), it can be considered that the above-described distortion-reduction configuration is especially effective.

It should be noted that the optical system shown in FIG. 2 is an example, the present invention is not limited to providing the UV-LED with respect to the aforementioned configuration in which a chromatic aberration of magnification is reduced. It is also possible to obtain three UV lights with different wavelengths from a light source 1 (see FIG. 14B in the pamphlet of International Laid-Open WO 2005/116719).

Figure 5:
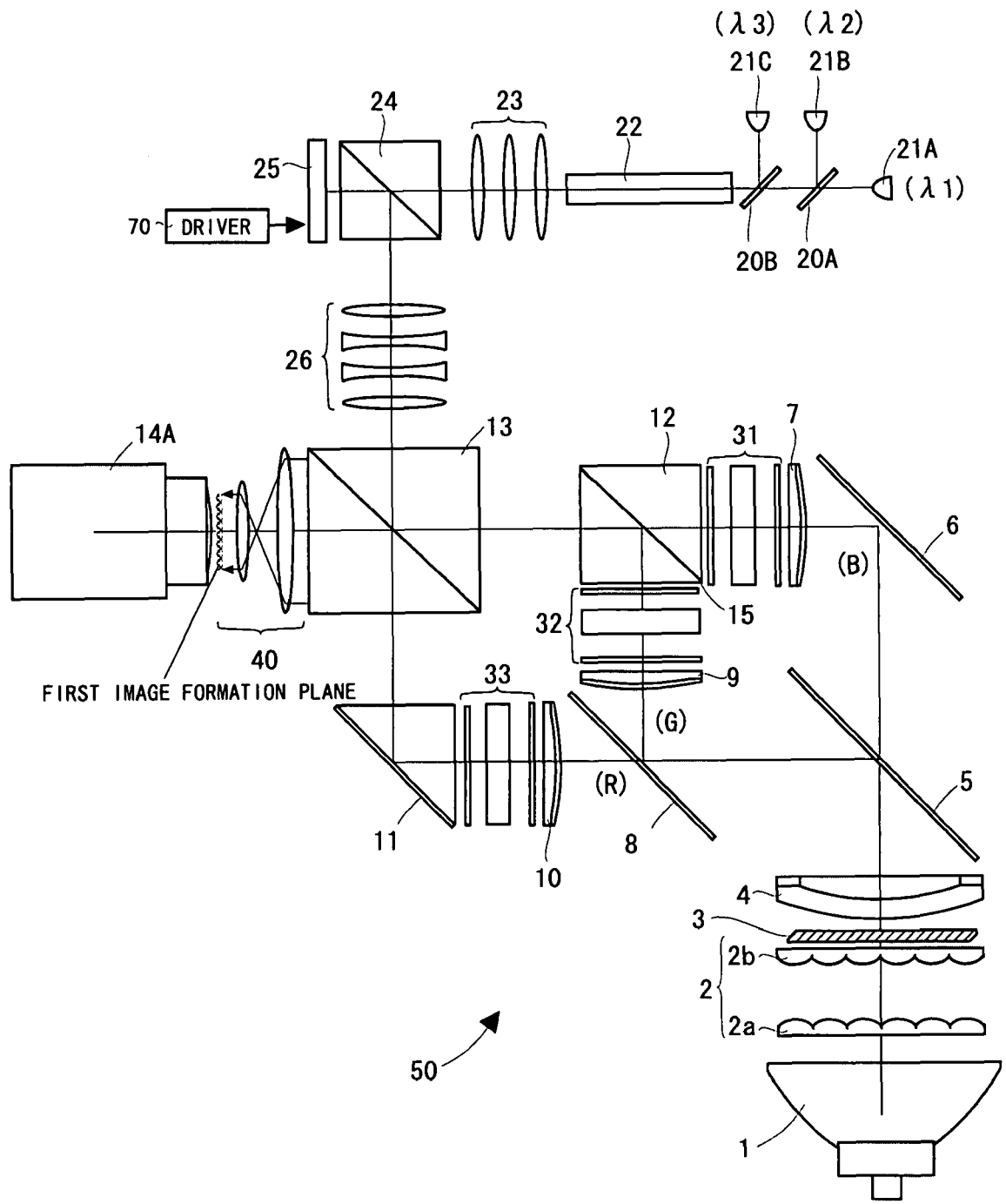
FIG. 5 is an explanation view showing a configuration having an image formation optical system in the configuration of FIG. 2.

FIG. 5 shows an modified example of the projection type video display according to the present invention. The projection type video display 50 is provided with an image formation optical system 40 at the light exit side of the second dichroic cube 13. A reduced image formation plane (first image formation plane) of an image that is displayed on the read light valve is formed through the image formation optical system 40. The reduced image formation plane functions as an object plane of the projection lens 14A, and is projected through the projection lens 14A. With the above-mentioned configuration, the distance between the aforementioned image formation plane and a rear-element lens of the projection lens 14A can be set optionally, thereby making it possible to use an inexpensive small-aperture projection lens having a short back focal length.

Figure 6:
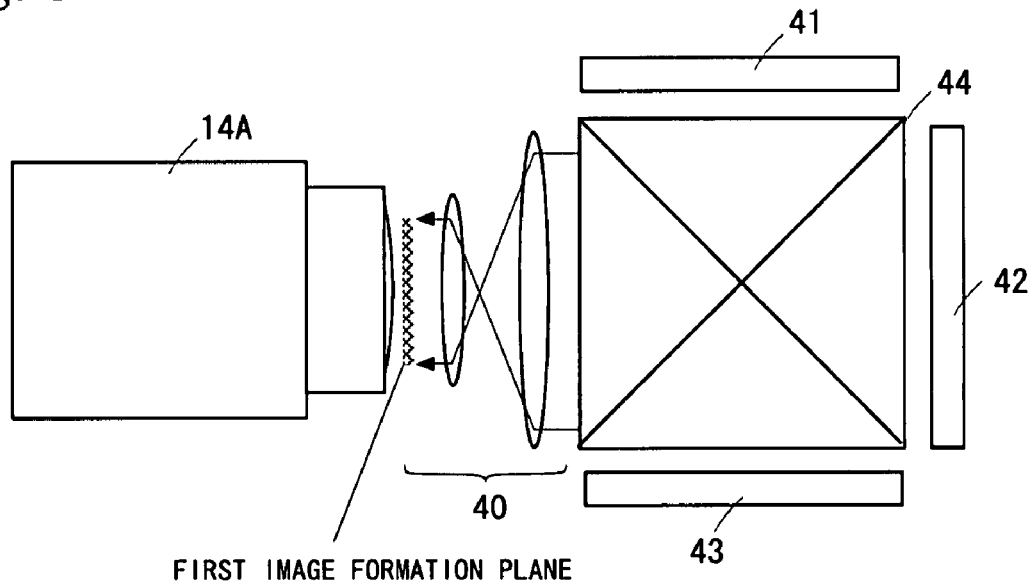
FIG. 6 is an explanation view showing another example of a configuration having an image formation optical system.

FIG. 6 shows an another example of the projection type video display which has the image formation optical system 40. Image lights which are formed by image display panels 41, 42 and 43 are combined together through a dichroic cube 44. The image display panels 41, 42 and 43 are not limited to a read light valve (an OASLM having a photoconductive effect), but may be a general liquid crystal display panel having a pixel electrode. Furthermore, it is possible to employ a configuration using a reflection-type image display panel such as LCOS or DMD (Digital Micromirror Device) as the image display panels 41, 42 and 43.

Figure 7:
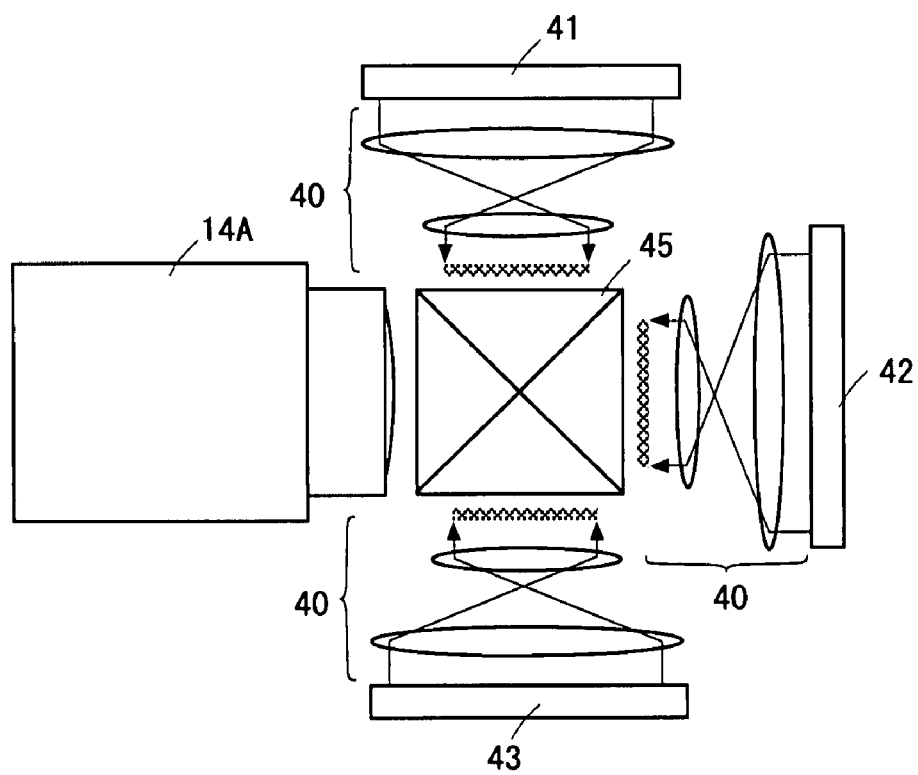
FIG. 7 is an explanation view showing another example of a configuration having an image formation optical system.

FIG. 7 shows another example of the projection type video display which has the image formation optical system 40. Each of image lights which are formed by transmission-type image display panels 41, 42 and 43 passes through the image formation optical system 40. Reduced image formation planes (first image formation planes) of images that are displayed on the read light valves are formed through the image formation optical system 40. The reduced image formation planes are combined together through a cross dichroic cube 45, and are projected through a projection lens 14A. With the configuration shown in FIG. 7, the image formation planes are provided at the light incident side of the cross dichroic cube 45, thereby making it possible to downsize the cross dichroic cube 45.

With the projection type video display in this embodiment, in a projection type video display in which an image writing to a read light valve which generates projection image light is performed by using light, an inconvenience (a distortion of a projected image, a chromatic aberration of magnification of the projected image) due to an optical cause can be reduced. (Mechanism for Downsizing)

Next, a configuration using a single transmission-type read light valve, in a projection type video display in which an image writing to a read light valve which generates projection image light is performed by using light, is desired. That is, with this configuration, downsizing and cost cutting of the projection type video display are realized. Hereinafter, a projection type video display which can be downsized, in a projection type video display in which an image writing to a read light valve which generates projection image light is performed by using light, will be described.

Figure 8:
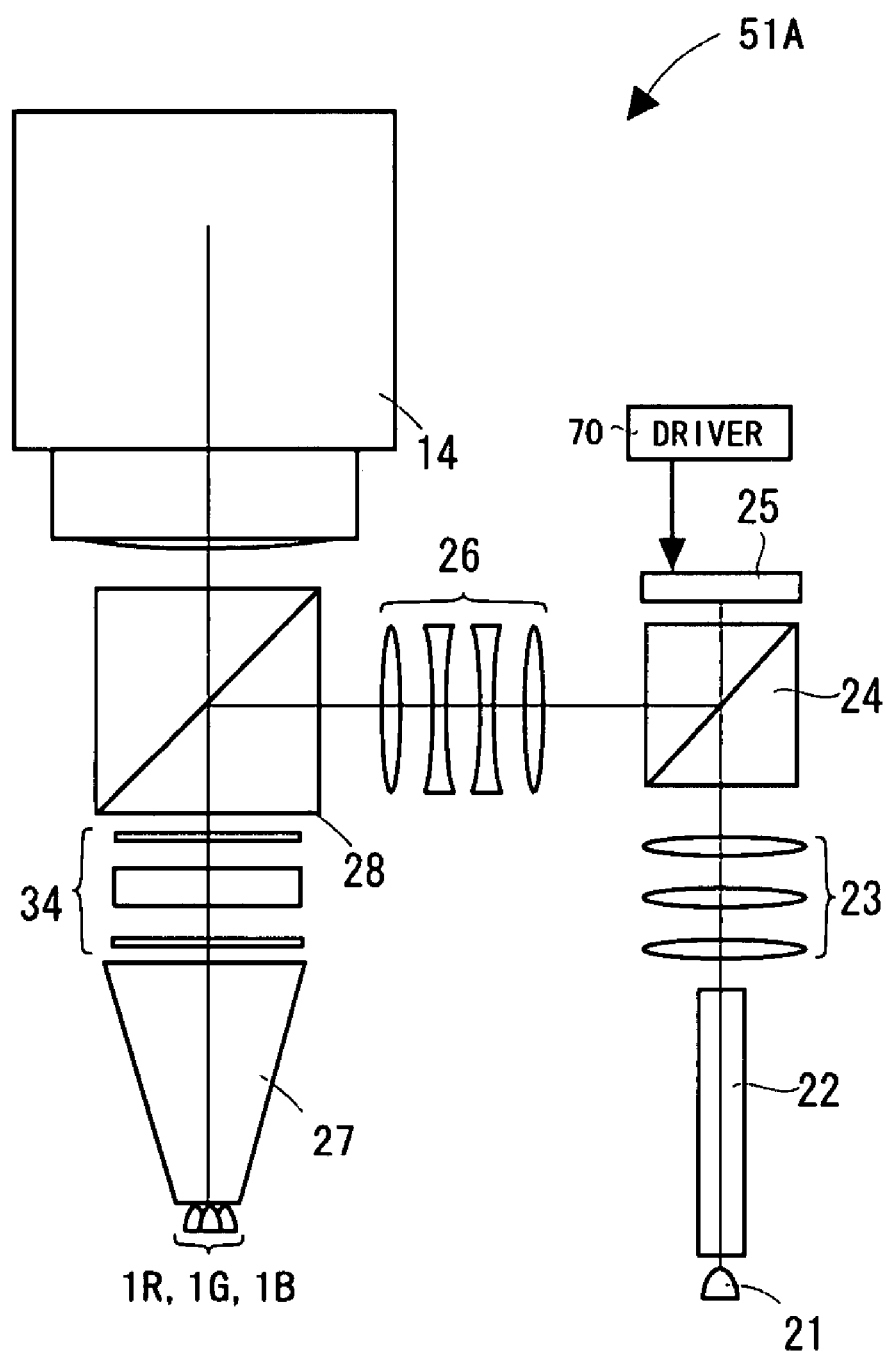
FIG. 8 is an explanation view illustrating a single-panel type projection type video display according to an embodiment of the present invention.

FIG. 8 is an explanation view illustrating an embodiment of a single-panel type projection type video display 51A. Components common to those in the projection type video display shown in FIG. 2 are assigned the same numerals and descriptions thereof will not be repeated. The projection type video display 51A is provided with a red color LED 1R, a green color LED 1G and a blue color LED 1B, as a light source. These LEDs 1R, 1G and 1B are turned on in a time-sequential manner. Color light emitted from each of the LEDs is incident on a tapered rod integrator 27. Each color light passes through the rod integrator 27 to provide a surface illuminant with a uniform light intensity and with a low divergence angle on an exit surface of the rod integrator 27. Each color light emitted from the exit surface is introduced into a dichroic cube 28 after passing through a read light valve 34. The dichroic cube 28 reflects UV light while transmitting visible light.

The read light valves 34, as disclosed in the pamphlet of International Laid-Open WO 2005/116719, is composed of an OASLM (Optically Addressed Spatial Light Modulator) having a photoconductive effect. For example, with a configuration in which a liquid crystal layer is interposed between optically transparent electrode structures having a photoconductive effect, photoconductive effect changes in only its portion where light is irradiated, with the result that a state of application of a voltage to the liquid crystal changes in the portion where light is irradiated, changing a state of rotation of the liquid crystal.

Next, an image writing optical system will be described hereinbelow. The image writing optical system includes a single UV-LED (light-emitting diode) 21. UV light emitted from the UV-LED 21 is incident on the rod integrator 22. The UV light passes through the rod integrator 22 to provide a surface illuminant with a uniform light intensity on an exit surface of the rod integrator 22. The UV light emitted from the exit surface is introduced into the polarization beam splitter 24 after passing through the relay lens group 23.

First particular polarized light (for example, P-polarized light) which has passed through the polarization beam splitter 24 is directed to the write light valve (LCOS device) 25 which modulates write lights (the UV lights). The write light valve 25 generates images for respective colors in a time-sequential manner with the driver 70. That is, the driver 70 writes a first image into the write light valve 25 based on a blue color video signal, writes a second image into the write light valve 25 based on a green color video signal, and writes a third image into the write light valve 25 based on a red color video signal. The forming of the first image, the forming of the second image, and the forming of the third image are sequentially repeated.

The write light valve 25 generates image light by modulating the received first particular polarized light. The aforementioned image light is obtained as reflected light, and the reflected light is changed into second particular polarized light (for example, S-polarized light). That is, when the first particular polarized light is irradiated onto the write light valve 25, image-writing light having the second particular polarized light (S-polarized light) is generated. The image-writing light emitted from the write light valve 25 is reflected on the polarization beam splitter 24. The image-writing light is introduced into the dichroic cube 28 through the imaging lens group (image formation optical system) 26.

As described above, the dichroic cube 28 reflects UV light while transmitting visible light. The image-writing light which is UV light is introduced into the read light valve 34 after being reflected on the dichroic cube 28 to write an image on the read light valve 34. At the time that the first image is written, the blue color LED 1B is turned on so that the blue light is irradiated onto the read light valve 34. At the time that the second image is written, the green color LED 1G is turned on so that the green light is irradiated onto the read light valve 34. At the time that the third image is written, the red color LED 1R is turned on so that the red light is irradiated onto the read light valve 34.

Each color image light which is obtained by each color light passing through the read light valve 34 is introduced into the projection lens 14 after passing through the dichroic cube 28. The color image light is projected onto a not-shown screen through the projection lens 14.

It should be noted that a polarization beam splitter (28A) may be used in place of the dichroic cube 28. In this case, a read light valve 34A not having a light exit-side polarizer is used (see FIG. 9).

Figure 9:
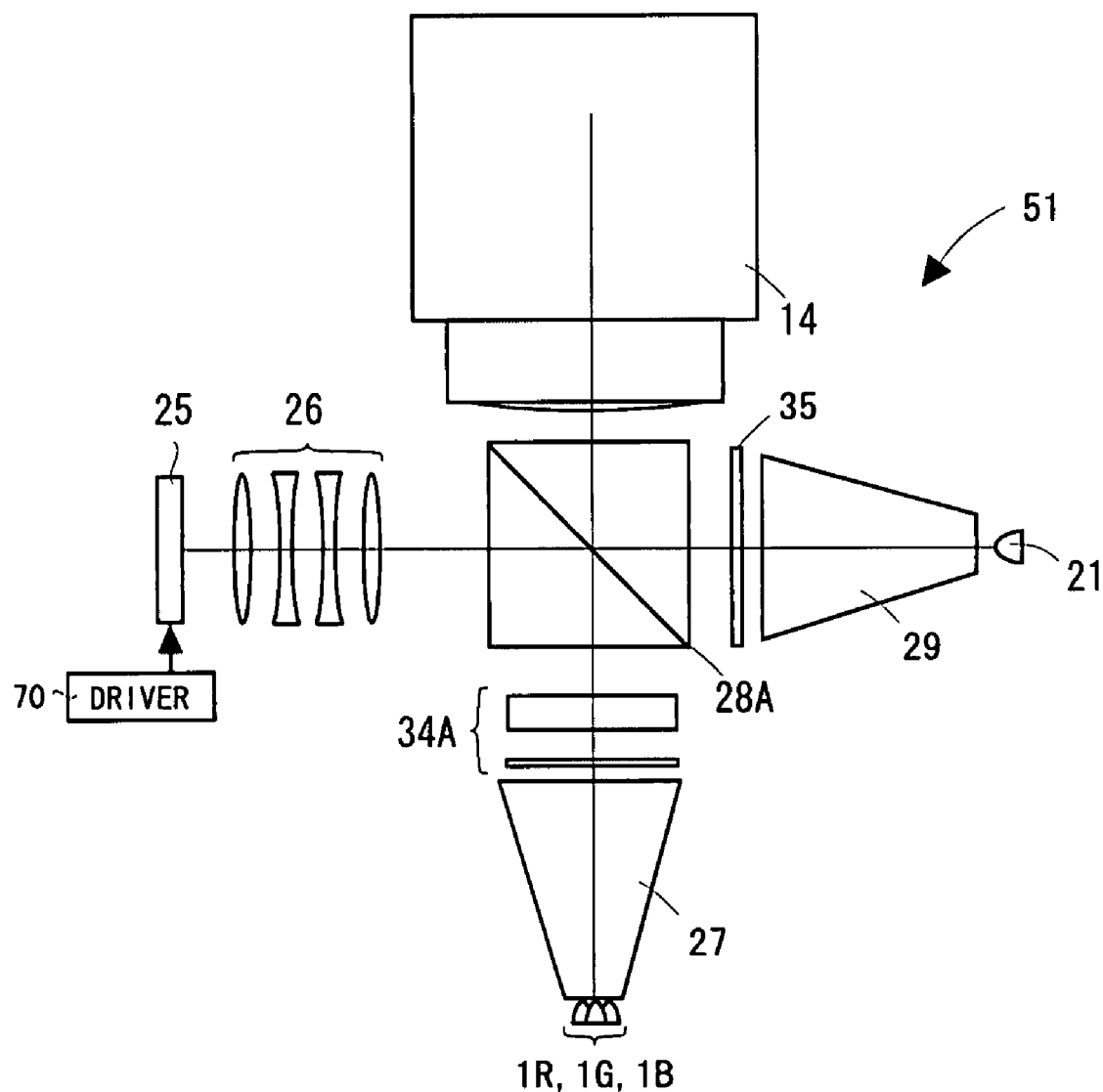
FIG. 9 is an explanation view illustrating an optical system in a single-panel type projection type video display according to another example of an embodiment of the present invention.

Next, with reference to FIG. 9, another example of a single-panel type projection type video display according to the embodiment of the present invention will be described. FIG. 9 shows an optical system of a projection type video display 51 according to the present embodiment. Components common to those in the projection type video display 51A are assigned the same numerals and descriptions thereof will not be repeated.

The projection type video display 51 has a polarization beam splitter 28A in place of the dichroic cube 28. In FIG. 9, at the right side of the polarization beam splitter 28A, there are provided a UV-LED 21, a tapered rod integrator 29, and a polarizer (a dielectric multi-layered film, a wire grid or the like) 35, while at the left side of the polarization beam splitter 28A, there are provided an imaging lens group (image formation optical system) 26 and a write light valve 25. UV light emitted from the UV-LED 21 is incident on the rod integrator 29. The UV light passes through the rod integrator 29 to provide a surface illuminant with a uniform light intensity and with a low divergence angle on an exit surface of the rod integrator 29.

Out of the emitted UV light from the light exit surface, only P-polarized light, for example, passes through the polarizer 35. The P-polarized light is introduced into the write light valve 25 after passing through the polarization beam splitter 28A and passing through the imaging lens group 26. Image-writing light (S-polarized light) which is obtained by UV light (write light) being reflected on the write light valve 25 is imaged on the read light valve 34A after passing through the imaging lens group 26 and being reflected on the polarization beam splitter 28A. An image for each color which is formed on the read light valve 34A is read out by each color illumination light, and is introduced into the projection lens 14 after passing through the polarization beam splitter 28A. The read light valve 34A does no have the light exit-side polarizer, while the polarization beam splitter 28A functions as the light exit-side polarizer.

With the aforementioned projection type video display 51, it is possible to eliminate the polarization beam splitter 24 which is needed for the projection type video display 51A.

Figure 10:
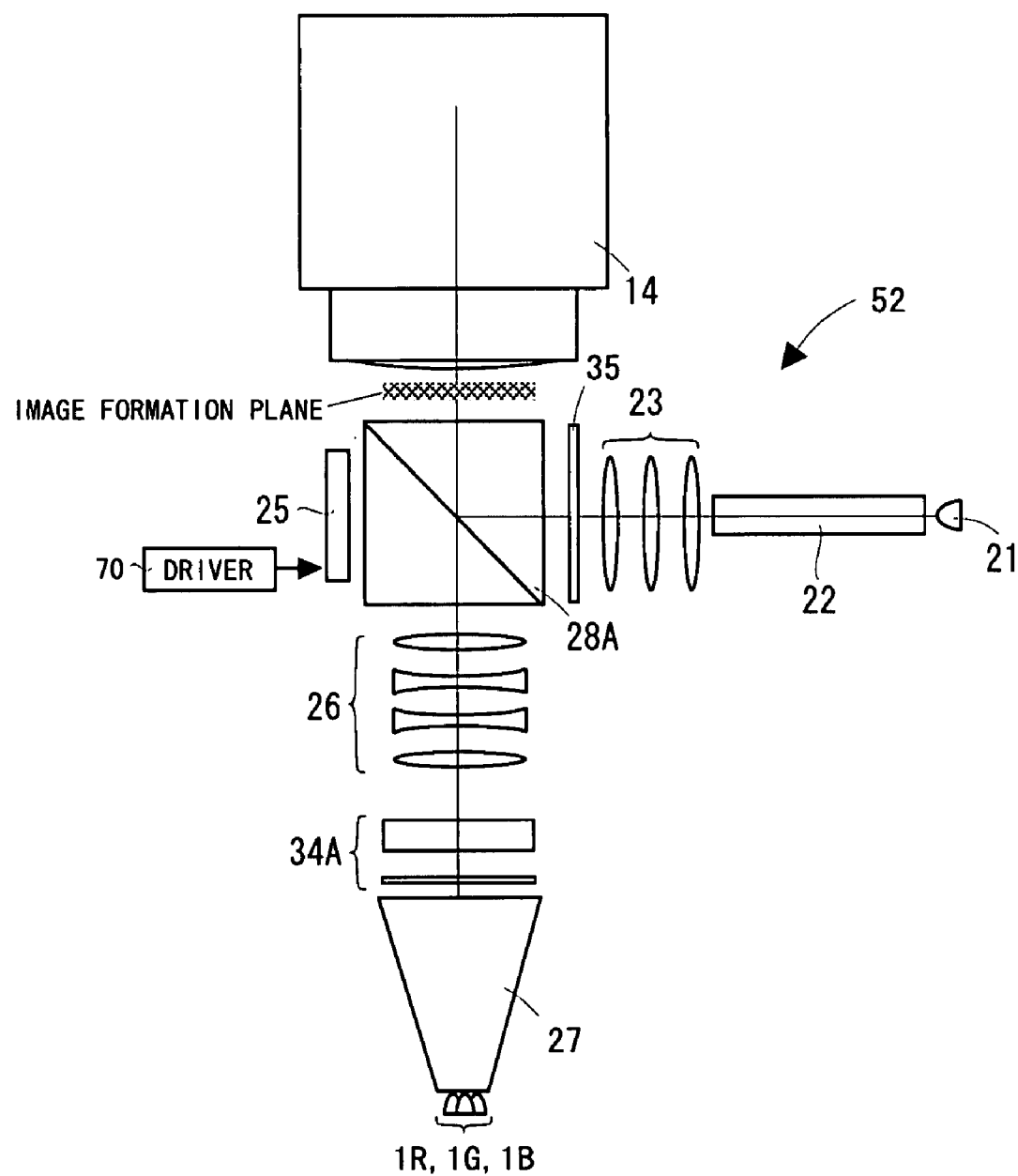
FIG. 10 is an explanation view illustrating an optical system in a single-panel type projection type video display according to still another example of an embodiment of the present invention.

Further, with reference to FIG. 10, still another example of a single-panel type projection type video display according to the embodiment of the present invention will be described. FIG. 10 shows an optical system of a projection type video display 52 according to the present embodiment. Components common to those in the projection type video display 51 are assigned the same numerals and descriptions thereof will not be repeated.

The projection type video display 52 has a polarization beam splitter 28A similarly to the projection type video display 51 in place of the dichroic cube 28. In FIG. 10, at the right side of the polarization beam splitter 28A, there are provided a UV-LED 21, a rod integrator 22, a relay lens group 23, and a polarizer 35, while at the left side of the polarization beam splitter 28A, there is provided a write light valve 25. Further, an imaging lens group 26 (image formation optical system) is placed between a read light valve 34A and the polarization beam splitter 28A.

The UV light emitted from the UV-LED 21 is incident on the rod integrator 22. The UV light emitted from the rod integrator 22 is introduced into the polarizer 35 after passing through the relay lens group 23. Only the P-polarized light, for example, which has passed through the polarizer 35 is introduced into the write light valve 25 after passing through the polarization beam splitter 28A. Image-writing light (S-polarized light) which is obtained by UV light (write light) being reflected on the write light valve 25 is imaged on the read light valve 34A after being reflected on the polarization beam splitter 28A and further passing through the imaging lens group 26. An image for each color which is formed on the read light valve 34A is read out by each color illumination light, and then passes through the polarization beam splitter 28A after passing through the imaging lens group 26. When the image light for each color emitted from the read light valve 34A passes through the imaging lens group 26, an image formation plane of the image for each color is formed between the polarization beam splitter 28A and the projection lens 14.

With the aforementioned projection type video display 52, the image formation plane is formed near the rear-element lens of the projection lens 14, thereby making it possible to use a small-aperture projection lens having a short back focal length as the projection lens 14.

Figure 11:
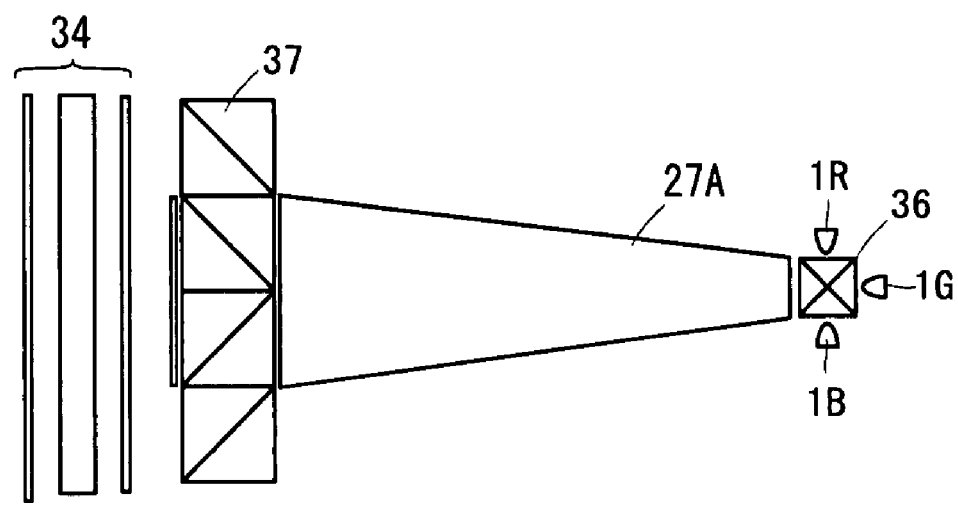
FIG. 11 is an explanation view illustrating a light source that can be used for a projection type video display according to the present invention.

It should be noted that it is possible to use a light source shown in FIG. 11 as the light source of the projection type video displays 50, 51A, 51 and 52. The light source is provided with the red color LED 1R, the green color LED 1G and the blue color LED 1B on three light incidence surfaces of a cross dichroic cube 36 respectively. From a light exit surface of the cross dichroic cube 36, each color light emitted from each of the LEDs is emitted. Each color light is incident on a tapered rod integrator 27A. A polarization conversion device 37 is provided on a light exit surface of the tapered rod integrator 27A. The polarization conversion device 37 has a dielectric multi-layered film (polarized light separating surface) in V-shaped at a position facing the light exit surface of the rod integrator 27A. S-polarized light reflected on one surface of the dielectric multi-layered film is reflected by an adjacent reflecting member thereof (or a dielectric multi-layered film); similarly, S-polarized light reflected on the other surface of the dielectric multi-layered film is reflected by an adjacent reflecting member thereof (or a dielectric multi-layered film). P-polarized light which has passed through the dielectric multi-layered film is converted to S-polarized light by the retardation plate ($1/2\lambda$ plate). That is, the light is aligned with the S-polarized light. As a matter of course, light can be aligned with P-polarized light.

With these aforementioned single-panel type projection type video displays, a projection type video display using a single read light valve is realized.

Furthermore, in these aforementioned single-panel type projection type video displays, the imaging lens group 26 may have a distortion aberration which reduces or cancels out a distortion aberration of the projection lens 14 (see FIG. 3A). Furthermore, in the configuration as shown in FIG. 8, 9, or 10, there may be provided UV-LEDs 21A, 21B and 21C with three different wavelengths (see FIG. 2) or a single UV-LED which emits three UV-lights with different wavelengths in a time-sequential manner. With these configurations, it is possible to write an image by the write light with shorter wavelength when a wavelength of light of image is longer, for example. Therefore, it is possible to reduce the difference in size between projected images due to the chromatic aberration of magnification.

It should be noted that the single-panel type projection type video display is not limited to the configuration shown in FIG. 8, 9, or 10. With a configuration which has a light optical system, a distortion of a projected image can be reduced. Further, with a configuration in which write lights having different wavelengths are emitted, a chromatic aberration of magnification can be reduced. Further, in a three-panel type projection type video display, it is also possible to employ solid light-emitting elements such as a white color LED or respective color LEDs in place of the light source 1.

(Configuration for Reducing Convergence Error)

Figure 12A:
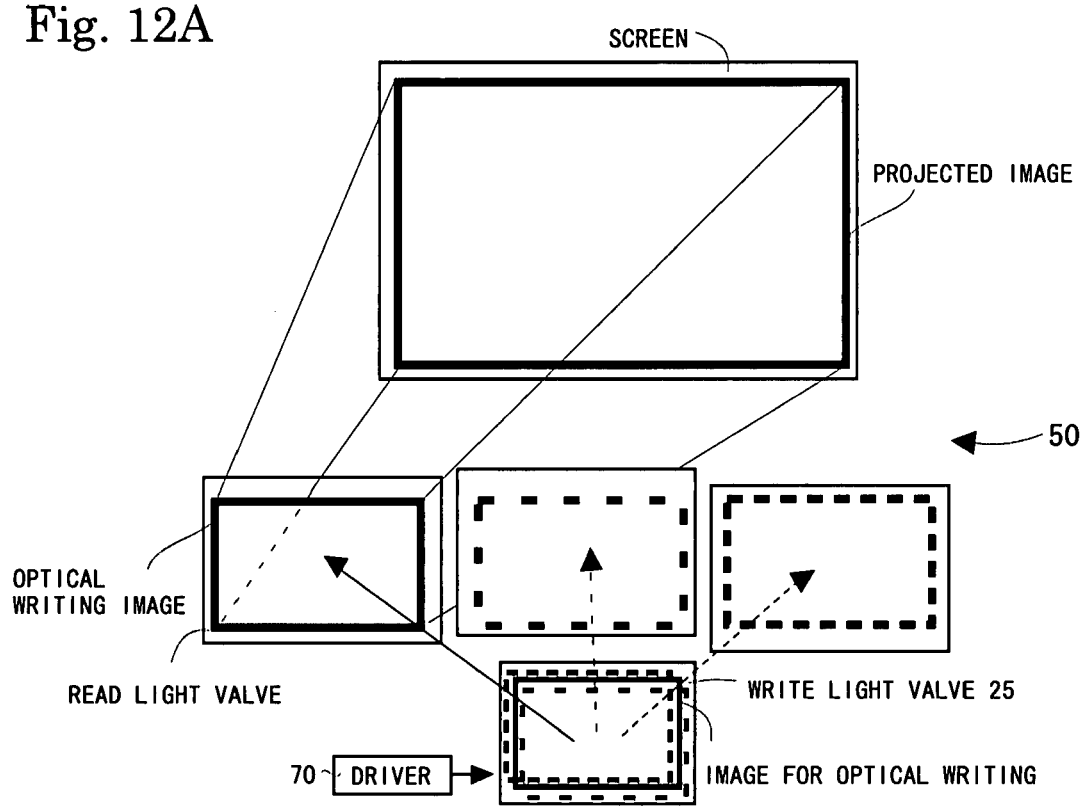
FIG. 12A is an explanation view showing a situation where quadrangle shape images written into a write light valve at different positions are written into read light valves, and the written image by using light on the read light valves are projected on the same position on a screen.

Next, a configuration which enables to reduce inconvenience (a convergence error, a distortion of a projected image, a chromatic aberration of magnification of the projected image) due to an optical cause, in a projection type video display in which an image writing to a read light valve which generates projection image light is performed by using light, will be described. FIG. 12A shows a situation where a quadrangle shape image written into the write light valve 25 is written into the read light valves 31, 32 and 33, and the written images by using light on these read light valves are projected on a screen. It should be noted that for comparison purposes, FIG. 12B shows the same situation in the conventional projection type video display 100.

[Convergence]

Figure 12B:
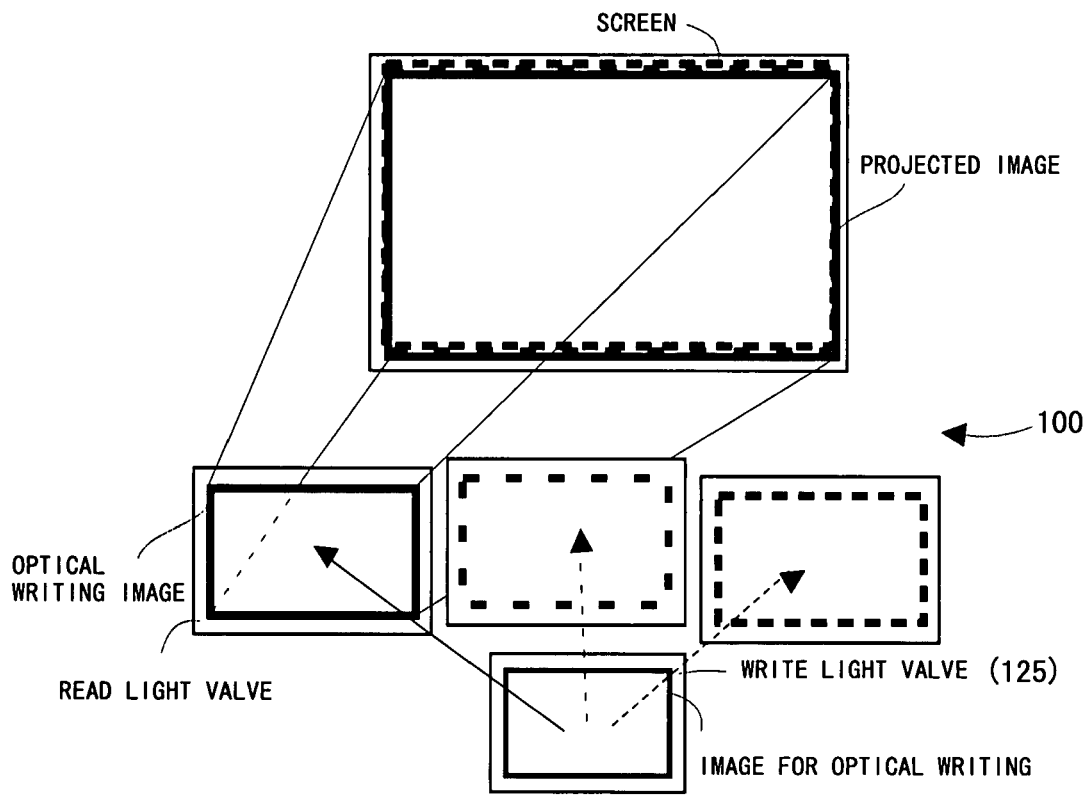
FIG. 12B is an explanation view showing the same situation in a conventional projection type video display, for comparison purposes.

In the conventional projection type video display 100, as shown in FIG. 12B, images for optical writing (quadrangle shape images) are written into the same position on the write light valve(125). In a case where the accuracies of the position, the direction and so on of each element of the write optical system (including a portion also used as a read optical system) are low, however, a relative shift occurs in the position of the written image by using light on each of the read light valves. Therefore, there is a fear that a convergence is not obtained.

With the projection type video display 50 according to the present invention, the driver 70 adjusts the positions of the images for each color on the write light valve based on given position adjustment amount. For example, in a test before leaving the factory, a convergence adjustment is executed by means of projection of a test pattern. For example, with the purpose of defining the shift amount of the image for each color, an up-and-down adjustment volume and a right-and-left adjustment volume are provided for the color. A tester adjusts the volumes in the convergence adjustment process. The resistance values (voltage values) of the adjusted volumes are supplied to the driver 70. The driver 70 shifts the image writing position on the write light valve 25 rightward, leftward, upward, or downward only by one pixel or by a plurality of pixels for each color based on the adjusted resistance value of the volume (that is, a given position adjustment amount). In a state where the convergence adjustment is perfected, the volumes may be locked. Alternatively, the projection type video display 50 may be configured such that a key indicating a completion of convergence is provided the position adjustment amount is stored in a memory as a digital value by depending the key, and the driver 70 obtains the position adjustment amount from the memory in the image processing.

As described above, since the convergence adjustment can be thus executed by controlling image-writing for each color to the write light valve 25, the adjustments for position and attitude of a constructional element constituting the optical system which writes the image into each of the read light valves are not particularly necessary. Further, the convergence adjustment is executed by writing control of the image to the single write light valve 25.

[Chromatic Aberration of Magnification]

Figure 13A:
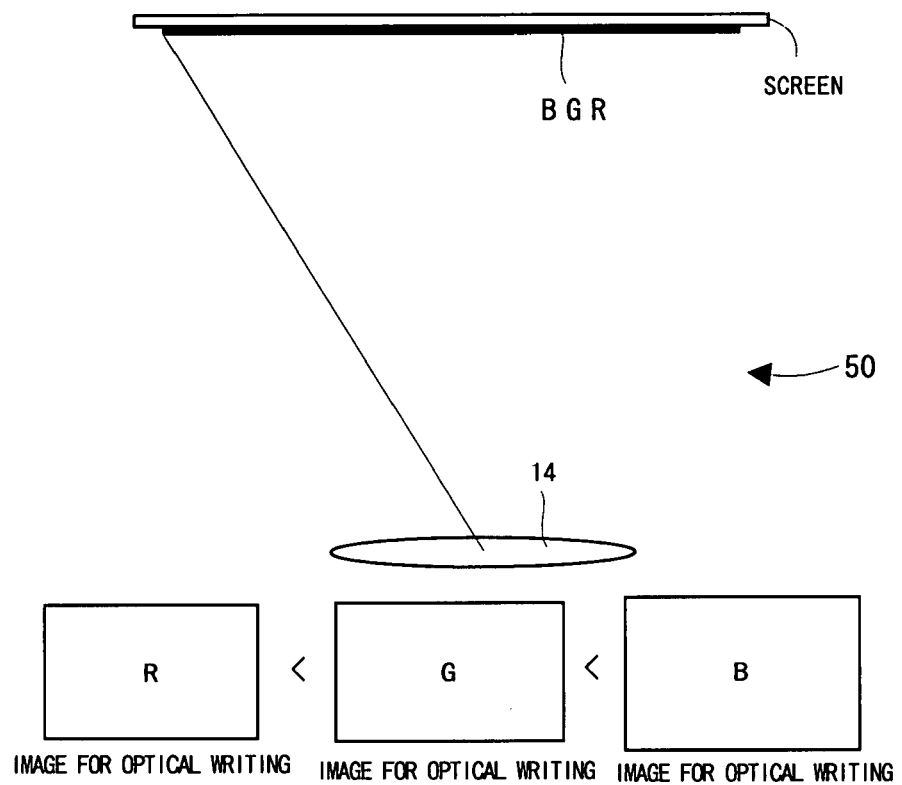
FIG. 13A is an explanation view showing a situation where written images using light on read light valves are projected on a screen.
Figure 13B:
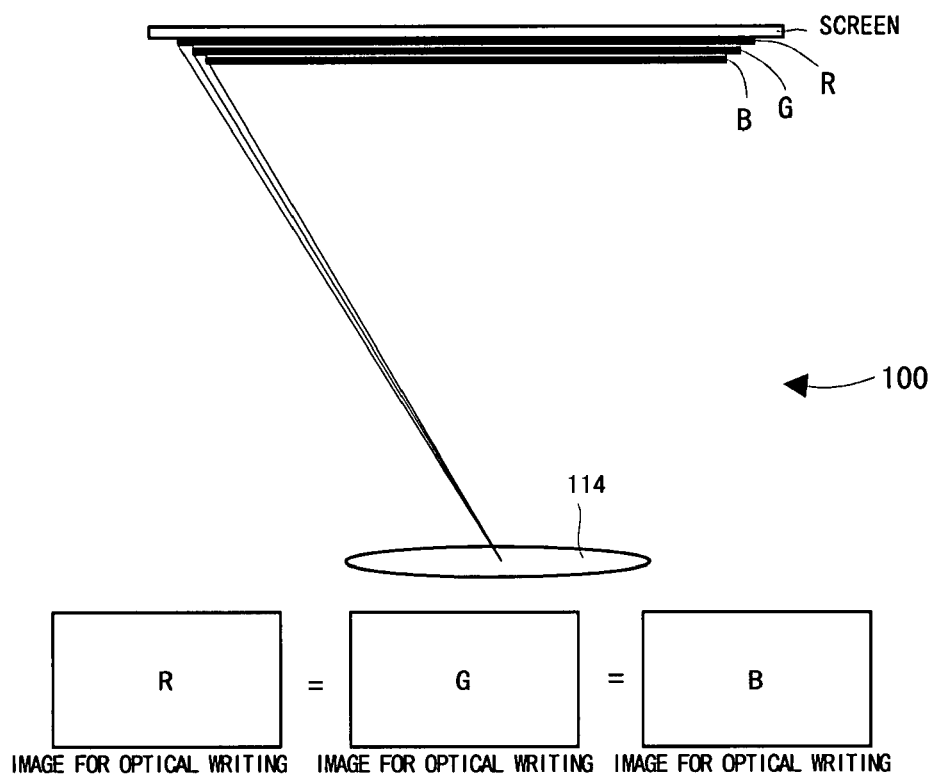
FIG. 13B is an explanation view showing the same situation in a conventional projection type video display, for comparison purposes.

FIG. 13A shows a situation where respective written images using light on the read light valves 31, 32 and 33 are projected on the screen. It should be noted that for comparison purposes, FIG. 13B shows the same situation in the conventional projection type video display 100. Here, it is assumed that the projection lens 14 (114) has a large chromatic aberration of magnification. In this case, as shown in FIG. 13B, in a case where the sizes of images for optical writing on the write light valve are the same, the sizes of the respective written images using light on the read light valves become the same, which causes a difference in size between color projected images on the screen. Specifically, when a center of a blue color wavelength is denoted by $\lambda 11$, a center of a green color wavelength is denoted by $\lambda 12$, and a center of a red color wavelength is denoted by $\lambda 13$, a relationship of $\lambda 11 < \lambda 12 < 13\lambda$ is satisfied. Therefore, a red color image is the largest, a blue color image is the smallest, a green color image is intermediate in size therebetween due to the chromatic aberration of magnification. It should be noted that depending on a combination of lenses in the projection lens 14(114), there is such a case that a blue color image is the largest, a red color image is the smallest, a green color image is intermediate in size therebetween.

With the projection type video display 50 according to the present invention, the driver 70 adjusts the sizes of the images for each color which are written into the write light valve 25 differ from one another based on the given size adjustment amount. For example, it can be also considered that one size adjusting volume is provided for each color with the purpose of defining the size of the image for each color. Since we can know the chromatic aberration of magnification of the projection lens 14 previously, however, it is able to provide a data indicating the size of the image with respect to each color previously to the driver 70. The driver 70 adjusts the size of the image to be written into the write light valve 25 based on the data indicating the size of the image for each color (that is, a given size adjustment amount).

For example, it is assumed that the write light valve 25 is designed for 1024×768 dots. Further, (1) the driver generates image data by data sampling or pixel skipping according to 1024×768 dots, and writes the image data using 1024×768 dots in the write light valve 25 with respect to an inputted blue color video signal, for example, (2) the driver generates image data by data sampling or pixel skipping according to 1022×766 dots, and writes the image data using 1022×766 dots in the write light valve 25 with respect to an inputted green color video signal, for example, and (3) the driver generates image data by data sampling or pixel skipping according to 1020×764 dots, and writes the image data using 1020×764 dots in the write light valve 25 with respect to an inputted red color video signal, for example.

It should be noted that it is determined that the sizes of the images for each color may be made to differ as described above, to carry out an optical design of the projection lens 14 with respect to the chromatic aberration of magnification. In this case, the degree of correction of the chromatic aberration of magnification is reduced, thus improving the degree of freedom in the design of the projection lens 14.

[Reduction of Distortion]

FIG. 14A shows a situation where a quadrangle shape image inputted as image data is distorted intentionally in a barrel shape by image processing and the distorted image is written into the write light valve 25, the barrel shape image is similarly written into the read light valves 31, 32 and 33 through the imaging lens group 26, and the written image (the barrel shape) is returned to a quadrangle shape image by the distortion aberration of the projection lens 14 when projected. It should be noted that for comparison purposes, FIG. 14B shows the same situation in the conventional projection type video display 100.

Figure 14B:
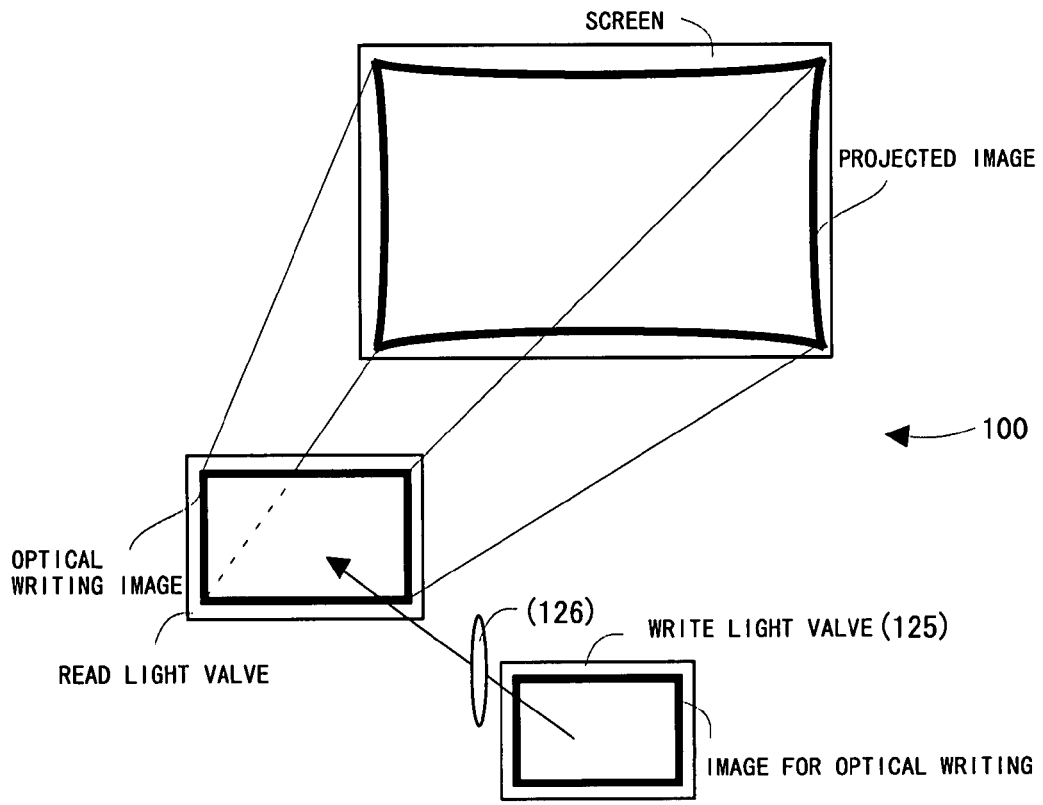
FIG. 14B is an explanation view showing the same situation in a conventional projection type video display, for comparison purposes.

In the conventional projection type video display 100, as shown in FIG. 14B, the quadrangle shape image written into the write light valve(125) is similarly written into the read light valve through the imaging lens group(126). However, the written image by using light on the read light valve is distorted due to the distortion aberration of the projection lens (114) and has a pincushion shape on the screen. On the other hand, in the projection type video display 50 according to the present invention, since the barrel shape image is written into the write light valve 25, the barrel shape image is also written into the read light valve by using light. And then, the barrel shape image is projected through the projection lens 14, thereby forming the quadrangle shape image on the screen.

That is, with the projection type video display 50 according to the present invention, the driver 70 generates image data that is a distorted image based on the given distortion adjustment amount and writes the distorted image into the write light valve based on the image data. For example, it can be also considered that one volume is provided with the purpose of defining the degree of the distortion of the image. Since we can know the distortion aberration of the projection lens 14 previously, however, it is only necessary to provide the data defining the degree of the distortion previously to the driver 70. The driver 70 processes the image so that the quadrangle shape image is deformed into a barrel shape based on the data defining the degree of the distortion (that is, a given distortion adjustment amount). A technique for texture-mapping a 2-D image onto a 3-D surface can be utilized as an example of the aforementioned processing.

It should be noted that in a case where the barrel shape distortion occurs in the image projected through the aforementioned projection lens 14, image processing which is the reverse of the aforementioned image processing may be employed. That is, the driver 70 may carry out the image processing for transforming the image to a pincushion shape based on inputted image data.

Furthermore, the optical system shown in FIG. 2 is an example, and the present invention is not limited to providing three UV-LEDs whose wavelengths are different from one another. For example, a configuration in which three UV lights whose wavelengths are different from one another are emitted by switching irradiation by using a single UV-LED can be adopted (see FIG. 15 in the pamphlet of International Laid-Open WO 2005/116719). Further, a configuration comprising a dichroic X cube which combines three color image lights together and a dichroic cube (for introducing the write light) which is placed between the dichroic X cube and the projection lens is known (see FIG. 16 in the pamphlet of WO2005/116719). It this configuration, it can be considered that the configuration of the present invention is especially effective. The reason is that it is thought that the aforementioned distortion aberration is likely to occur in a configuration in which two cubes are disposed adjoining each other at the light incidence side of the projection lens for combining color images and for introducing write lights, for example (also see FIGS. 17A and 17B in the pamphlet of International Laid-Open WO 2005/116719.)

In the single-panel type projection type video display as shown in FIG. 8, 9 or 10, as described above, the driver 70 adjusts the size of the image for each color which is written into the write light valve 25 based on the data indicating the size of the image for each color (that is, a given size adjustment amount). Accordingly, it is possible to reduce inconvenience due to the chromatic aberration of magnification of the projection lens 14. Further, the aforementioned driver 70 carries out image processing so that the quadrangle shape image is deformed into a barrel shape based on the data defining the degree of the distortion (that is, a given distortion adjustment amount). Accordingly, it is possible to resolve or reduce inconvenience due to the aforementioned distortion aberration of the projection lens 14. It should be noted that the single-panel type projection type video display is not limited to the configuration shown in FIG. 8, 9 or 10. Further, in the three-panel type projection type video display, it is also possible to employ solid light-emitting elements such as a white color LED, each color LED or the like in place of the light source 1.

With the projection type video display according to the present embodiment, in a projection type video display in which an image writing to a read light valve which generates projection image light is performed by using light, inconvenience (a convergence error, a distortion of a projected image and a chromatic aberration of magnification of the projected image) due to an optical cause can be reduced.

(Configuration not Having Lens Shift Device)

Conventionally, there have been known lens shift devices for shifting the position of a projection image without moving the body of a display. FIG. 15 shows a lens shift device 200 with a bearing as an example of the lens shift devices (see Japanese Patent Application No. 3643817). In the lens shift device for shifting the projection lens, however, high hardness and a high-power motor are needed, thereby increasing the size, weight or cost of the projection type video display. A configuration in which a mechanism which shifts the projection image without moving the body of the display, without increasing the size, weight and cost of the display, is provided, in a projection type video display in which an image writing to a read light valve which generates projection image light is performed by using light, will be described hereinafter. In view of the shifting of the write light valve 25, each of the read light valves 31, 32 and 33 has a rather large size so as to receive the image-writing light in the range of the shift. Each of the read light valves 31, 32 and 33 does not require a so-called pixel-electrode as described above, and hardly increases in cost even if it is large.

Figure 16:
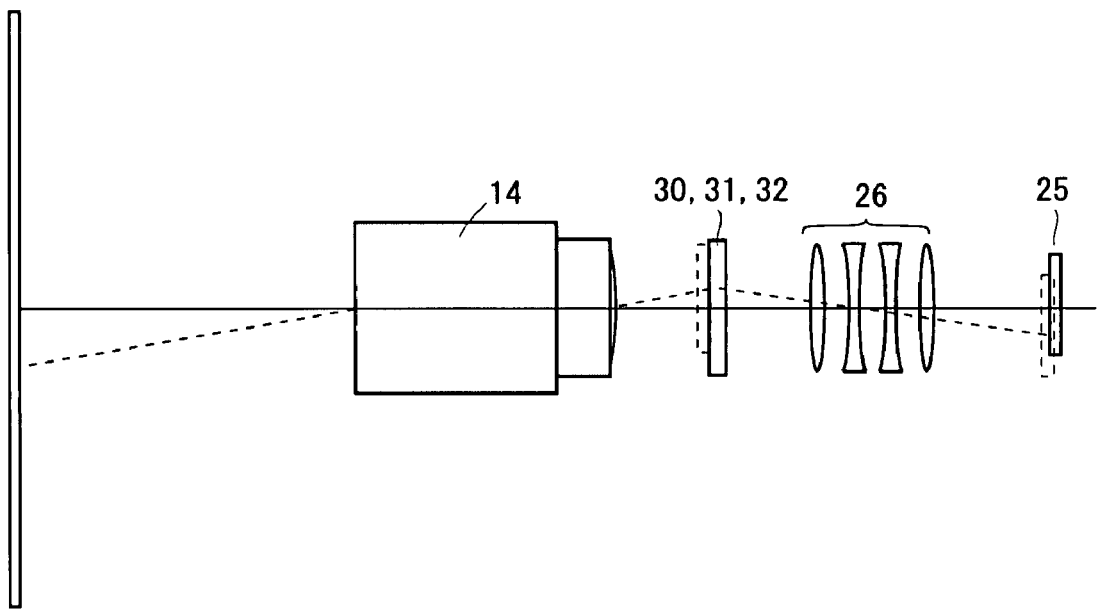
FIG. 16 is a view showing an embodiment of the present invention and an explanation view showing in a simplified optical system, an optical path changing in a case where a write light valve is shifted.

FIG. 16 is an explanation view showing in a simplified optical system an optical path changing in a case where the write light valve 25 is shifted. When the write light valve 25 is shifted, the position of the image-writing light is shifted in a common direction on all the read light valves 31, 32 and 33 in accordance with the shift amount. When the image-writing light is shifted, the projection image on the screen is also shifted. In view of the shifting of the write light valve 25, a flexible wiring is utilized as a wiring for feeding a driving signal to the write valve 25.

Figure 17:
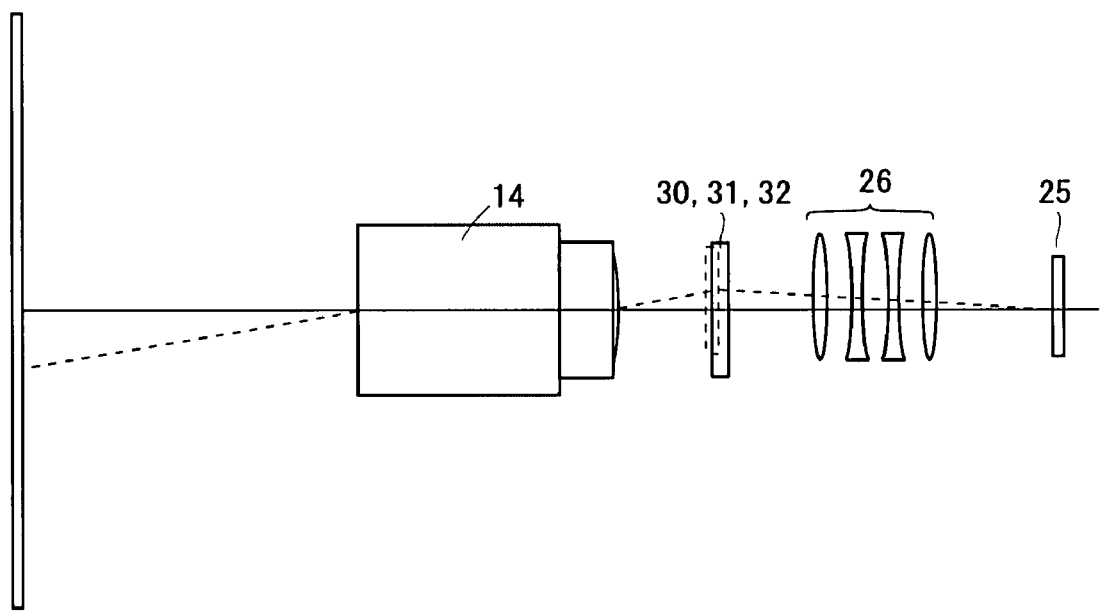
FIG. 17 is a view showing an embodiment of the present invention and an explanation view showing in a simplified optical system, an optical path changing in a case where an imaging lens group is shifted.

FIG. 17 is an explanation view showing in a simplified optical system an optical path changing in a case where the imaging lens group 26 is shifted. When the imaging lens group 26 is shifted, the position of the image-writing light in a common direction on all the read light valves 31, 32 and 33 in accordance with the shift amount. When the image-writing light is shifted, the projection image on the screen is shifted.

Figure 18:
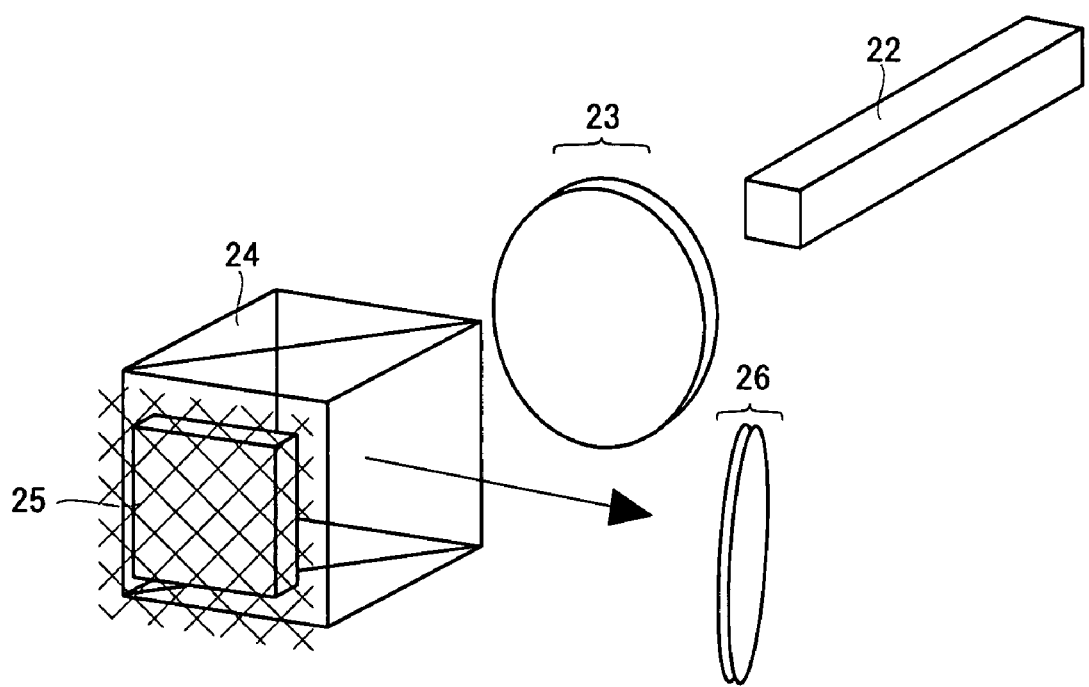
FIG. 18 is a view showing an embodiment of the present invention, and a perspective view showing a writing optical system.

In a case where the configuration in FIG. 16 is employed, the size of the write light valve 25 is sufficiently smaller than an irradiation area of write light (i.e., a surface of the polarization beam splitter 24) as shown in FIG. 18. Even when the write light valve 25 is shifted, the write light valve 25 can receive write light at any position to which the write light valve 25 is moved.

Figure 19A:
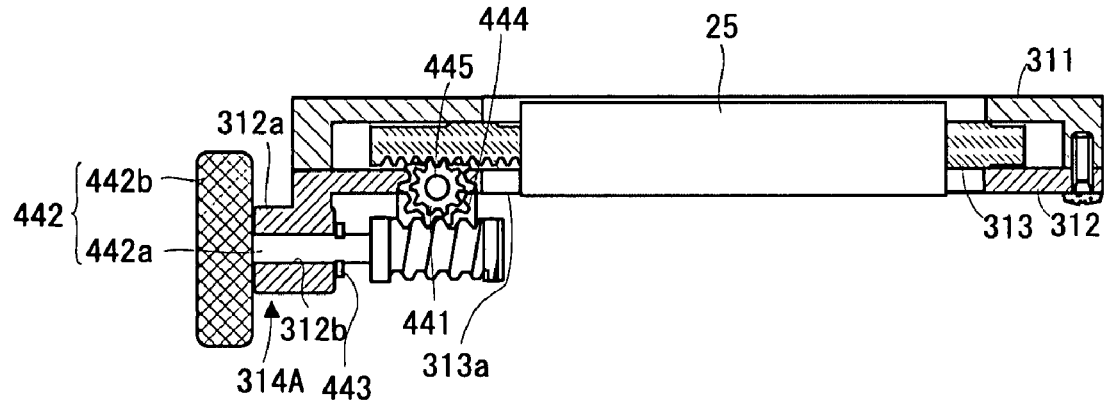
FIG. 19A is a view showing an embodiment of the present invention and a cross-sectional view showing a shift device of a write light valve.
Figure 19B:
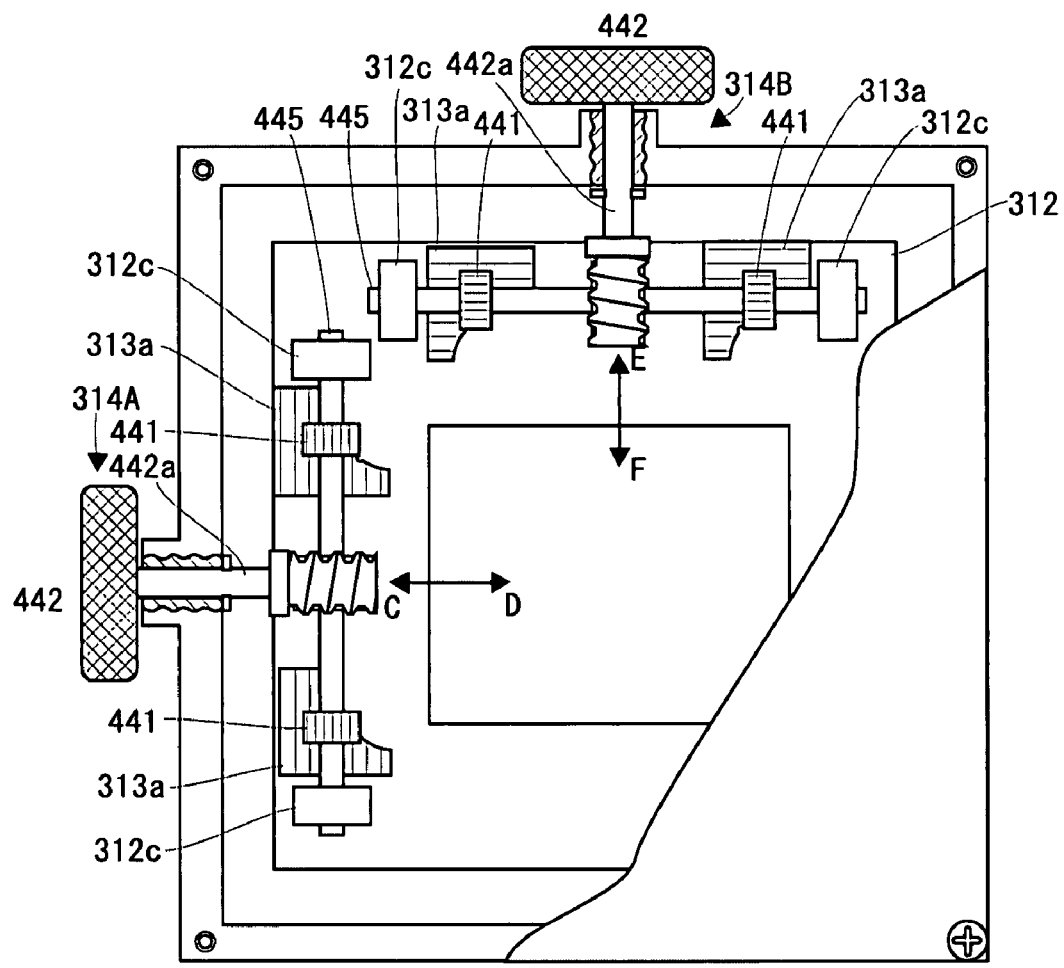
FIG. 19B is a front view thereof.

It is possible to use the lens shift device shown in Japanese Unexamined Patent Application Publication No. 2004-245956, for example, as a light valve shift device which shifts the writ light valve 25. Specifically, as shown in FIGS. 19A and 19B, the light valve shift device is equipped with a first fixed-side plate 311, a second fixed-side plate 312, a light valve holder 313, and drive mechanism sections 314A and 314B. The second fixed-side plate 312 is fixed with its external surface used as a datum plane contacted with a chassis of the projection type video display. The write light valve 25 is fixed to the light valve holder 313. The light valve holder 313 is sandwiched between the first fixed-side plate 311 and the second fixed-side plate 312 and can move in the directions of up-and-down and right-and-left by being guided by the plate 311 and 312. Both surfaces of the light valve holder 313 and respective inner surfaces of the fixed side plate 311 and 312 which face the aforementioned surfaces of the light valve holder 313 function as a sliding surface.

A quadrangle opening having a size corresponding to a permissible moving range of the write light valve 25 is formed in each of the first fixed-side plate 311 and the second fixed-side plate 312. Furthermore, openings which permit moving of a pair of pinions 441 and 411 in each of the drive mechanism sections 314A and 314B are formed in the second fixed-side plate 312, and a pair of racks 313a and 313a which engage the pinions 441 and 411 is formed in the light valve holder 313. The widths of the racks 313a and 313a are set in consideration of the permissible moving range of the write light valve 25 and the tooth widths of the pinion 441. The above-mentioned pinions 441 and 441 are fixed to a revolving shaft 445. The revolving shaft 445 is supported rotateably by a bearing 312c provided on a top surface of the second fixed-side plate 312.

A supporting portion 312a is formed in an edge of the second fixed side plate 312. A supporting hole 312b is formed in parallel with the surface of the second fixed-side plate 312, and adjustment dials 442 and 442 of the drive mechanism sections 314A and 314B are respectively inserted in the supporting holes 312b and 312b. The adjustment dial 442 comprises a worm gear 442a and a knob 442b placed on the head side of the worm gear 442a. An E-ring 443 engages the middle section of the worm gear 442a, preventing the adjustment dial 442 from coming off. Further, a worm wheel 444 is screwed in a gear field of the worm gear 442a. The worm wheel 444 is fixed to the center of the aforementioned revolving shaft 445.

When the worm gear 442a is rotated by turning the adjustment dial 442 in the drive mechanism section 314A, the worm wheel 444 is rotated. When worm wheel 444 rotates, the revolving shaft 445 is rotated to rotate the pinions 441 and 441. And then turning efforts of the pinions 441 and 441 are transmitted respectively to the racks 313a and 313a, which causes the light valve holder 313 in a direction of line C-D. Since a convex portion and a concave portion of the racks 313a and 313a on the side of the drive mechanism section 314B are formed in the direction of line C-D, a guide function is offered while permitting movement in the C-D direction of the light valve holder 313.

Similarly, when the worm gear 442a is rotated by turning the adjustment dial 442 in the drive mechanism section 314B, the worm wheel 444 is rotated. When worm wheel 444 rotates, the revolving shaft 445 is rotated to rotate the pinion 441 and 441. And then turning efforts of the pinions 441 and 441 are transmitted respectively to the racks 313a and 313a, which causes the light valve holder 313 to move in a direction of line E-F. Since a convex portion and a concave portion of the racks 313a and 313a on the side of the drive mechanism section 314A are formed in the direction of line E-F, a guide function is offered while permitting movement in the E-F direction of the light valve holder 313.

Although the aforementioned light valve shift device has a configuration in which a front surface, which functions as a datum plane, of the second fixed-side plate 312 is fixed in the chassis of the projection type video display in the example explained above, the light valve shift device is not limited to these embodiments. A rear surface, which functions as a datum plane, of the first fixed-side plate 311 may be abutted against a surface of the polarization beam splitter 24. This makes it possible to keep adequately the positional relationship between the polarization beam splitter 24 and the write light valve 25. In addition, although the light valve shift device capable of manual shifting by using the adjustment dial 442 in the example explained above, the light valve shift device is not limited to these embodiments. An electric actuator utilizing a motor or the like may rotate the worm gear 442a. The electric actuator is turned on or off with a switching operation of an operation panel.

A configuration similar to the configuration shown in FIG. 19 may be adopted for a mechanism which shifts the imaging lens group 26. In this case, manual operation using the adjustment dial 442 is not easy. Therefore, it is desirable that the electric actuator utilizing a motor or the like rotates the worm gear 442a.

Figure 20:
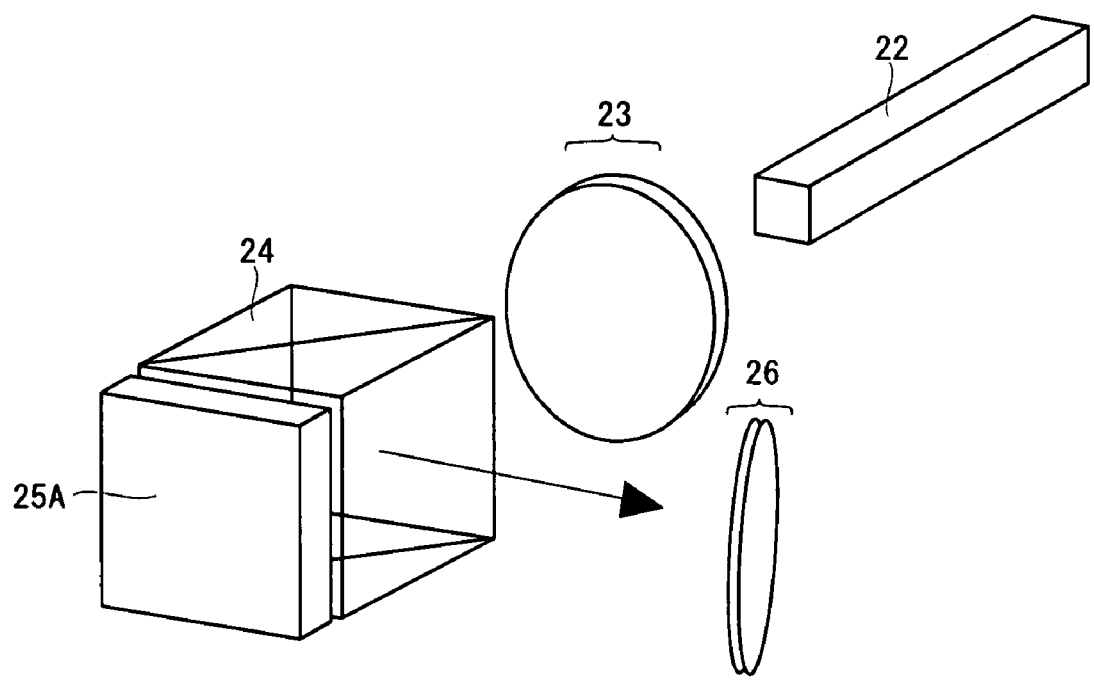
FIG. 20 is a view showing an embodiment of the present invention and a perspective view showing a writing optical system.

Although in the above-mentioned example, the write light valve 25 is shifted, the present invention is not limited to this. A write light valve 25A may be provided, as shown in FIG. 20, to shift an image which is written into the write light valve 25A. The size of the write light valve 25A is larger than the size of the write light valve 25. For example, if the write light valve 25 designed for 1024×768 dots, the write light valve 25A is designed for 2048×1536 dots. A shift-indication-operation unit in which a shift-indication signal is inputted by an user operation is mounted in the projection type video display. The shift-indication-operation unit comprises an up-and-down adjustment volume, a right-and-left adjustment volume, and a processor which generates adjustment values of up-and-down and right-and-left based on a value of resistance (a value of voltage) obtained from the volumes, which are mounted in the projection type video display. Alternatively, the shift-indication-operation unit comprises a direction indication key placed on a remote controller, and a processor which increases or decreases adjustment values of up-and-down and right-and-left based on a signal obtained when the key is operated.

The driver 70 adjusts the position of the image which is written into the write light valve based on the adjustment values of up-and-down and right-and-left. For example, if the adjustment values of up-and-down and right-and-left are 384 and 512, the driver 70 writes the image into the center in directions of up-and-down and right-and-left of the write light valve 25A. And then, the driver 70 shifts the image writing position upward by only one pixel, if the adjustment values of up-and-down and right-and-left change to 385 and 512, while shifting the image writing position downward by only one pixel if the adjustment values of up-and-down and right-and-left change to 383 and 512. In addition, the driver 70 shifts the image writing position rightward by only one pixel if the adjustment values of up-and-down and right-and-left change to 384 and 513, while shifting the image writing position leftward by only one pixel if the adjustment values of up-and-down and right-and-left change to 384 and 511.

It should be noted that the optical system shown in FIG. 2 is an example, and a configuration in which three UV lights whose wavelengths are different from one another are emitted by switching irradiation by using a single UV-LED can be adopted (see FIGS. 16A, 17A and 17B in the pamphlet of International Laid-Open WO 2005/116719). Further, if the three optical paths of write lights for each color are optically equivalent to one another, the one write light valve 25A is moved in a direction common to three written images using light. On the other hand, if the three optical paths of write lights for each color are not optically equivalent to one another (if image reversing occurs due to the presence of a relay lens optical system in only one of the optical paths, for example) (see FIG. 15 in the pamphlet of International Laid-Open WO 2005/116719), a configuration having a light valve shift device can not be adopted. On the other hand, the aforementioned configuration in which the image writing position on the write light valve 25A is shifted can be adopted, even if the image reversing occurs, because the shift direction of the written image for blue light, for example, can be opposite to the shift direction of the written image for the other color light.

It is also possible to adopt a shift mechanism which shifts the write light valve 25 or a shift mechanism which shifts the imaging lens group (image formation optical system) 26 in the single-panel type projection type video display as shown in FIG. 8, 9 or 10. In addition, it is also possible to shift the writing position of the image by adopting the write light valve 25A in the projection type video display. It should be noted that the single-panel type projection type video display is not limited to the configuration shown in FIG. 8, 9 or 10. Further, in the three-panel type projection type video display, it is also possible to employ a solid light-emitting element such as a white color LED, each color LED or the like in place of the light source 1.

With the projection type video display in these embodiments, in a projection type video display in which an image writing to a read light valve which generates projection image light is performed by using light, such effects that a mechanism which shifts the projection image without moving the body of the display is simplified in comparison whit the convention are obtained.

Other Embodiments

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A projection type video display, comprising:
a write light valve for generating image-writing light by modulating write light;
a driver for writing images into the write light valve based on image data;
read light valves for each color, in which an image is written by the image-writing light emitted from the write light valve, for generating respective color image lights by modulating received color illumination lights;
a writing optical system for guiding the image-writing light emitted from the write light valve to the respective read light valves;
means for combining together the color image lights emitted from the respective read light valves; and
a projection optical system for projecting each of the color image lights combined together,
wherein the sizes of the written images on the respective read light valves are different from one another due to the write lights having different peak-wavelengths, with the result that a difference in size between color projected images on a screen is reduced due to the occurrence of a chromatic aberration of magnification in the projection optical system.

2. The projection type video display according to claim 1, wherein on the condition that the peak-wavelength of each write light is denoted by $\lambda 1$, $\lambda 2$, $\lambda 3$ ($\lambda 1 > \lambda 2 > \lambda 3$) and the wavelength of each color illumination light is denoted by $\lambda 11$, $\lambda 12$, $\lambda 13$ ($\lambda 11 < \lambda 12 < \lambda 13$), an image writing using the write light with the wavelength $\lambda 1$ is performed when the color illumination light with the wavelength $\lambda 11$ is incident on the read light valve, an image writing using the write light with the wavelength $\lambda 2$ is performed when the color illumination light with the wavelength $\lambda 12$ is incident on the read light valve, and an image writing using the write light with the wavelength $\lambda 3$ is performed when the color illumination light with the wavelength $\lambda 13$ is incident on the read light valve.

3. The projection type video display according to claim 1, wherein the driver adjusts the position of the image for each color which is written into the write light valve based on a given position adjustment amount.

4. The projection type video display according to claim 1, wherein the driver adjusts the size of the image for each color which is written into the write light valve based on a given size adjustment amount.

5. The projection type video display according to claim 1, wherein there is further provided a shift device for shifting the write light valve or the writing optical system up and down and/or right and left in a plane perpendicular to an optical axis of image writing.

6. The projection type video display according to claim 1, wherein there is further provided a shift instruction operation portion to which a signal indicating a shift is inputted by an user operation, wherein the driver adjusts the position of the image for each color which is written into the write light valve based on the signal indicating the shift.

7. A projection type video display, comprising:
a write light valve for generating image-writing light by modulating write light;
a driver for writing images into the write light valve based on image data;
a single read light valve, in which images are written by the image-writing lights emitted from the write light valve, for generating respective color image lights by modulating received color illumination lights;
a writing optical system for guiding the image-writing light emitted from the write light valve to the read light valve; and
a projection optical system for projecting the image light emitted from the read light valve,
wherein the sizes of the written images on the read light valve are different from one another due to the write light having different peak-wavelengths, with the result that a difference in size between color projected images on a screen is reduced due to the occurrence of the chromatic aberration of magnification in the projection optical system.

8. The projection type video display according to claim 7, wherein on the condition that the peak-wavelength of each write light is denoted by $\lambda 1$, $\lambda 2$, $\lambda 3$ ($\lambda 1 > \lambda 2 > \lambda 3$) and the wavelength of each color illumination light is denoted by $\lambda 11$, $\lambda 12$, $\lambda 13$ ($\lambda 11 < \lambda 12 < \lambda 13$), an image writing using the write light with the wavelength $\lambda 1$ is performed when the color illumination light with the wavelength $\lambda 11$ is incident on the read light valve, an image writing using the write light with the wavelength $\lambda 2$ is performed when the color illumination light with the wavelength $\lambda 12$ is incident on the read light valve, and an image writing using the write light with the wavelength $\lambda 3$ is performed when the color illumination light with the wavelength $\lambda 13$ is incident on the read light valve.

9. The projection type video display according to claim 7, wherein there is further provided a polarization beam splitter and an optical member for introducing the image-writing light emitted from the write light valve to the read light valve and for introducing each color image light emitted from the read light valve to the projection optical system, wherein the write light is introduced into the write light valve after passing through the polarization beam splitter, the image-writing light is changed into particular polarized light and is returned to the polarization beam splitter, and the returned image-writing light is reflected on the polarization beam splitter and is introduced into the optical member after passing through the writing optical system.

10. The projection type video display according to claim 7, wherein there is further provided an optical member for introducing the image-writing light emitted from the write light valve to the read light valve and for introducing each color image light emitted from the read light valve to the projection optical system, wherein the write light is introduced into the write light valve after passing through the optical member and the writing optical system, and the image-writing light is introduced into the read light valve after passing through the writing optical system and the optical member.

11. The projection type video display according to claim 7, wherein there is further provided an optical member for leading the image-writing light emitted from the write light valve to the read light valve and for leading each color image light emitted from the read light valve to the projection optical system, wherein the write light is introduced into the write light valve after passing through the optical member, and the image-writing light emitted from the write light valve is introduced into the read light valve through the writing optical system after changing its optical path by the optical member, and each color image light is introduced into the projection optical system after passing through the writing optical system and the optical member, wherein an image formation plane of each color image light is formed between the projection optical system and the optical member.

12. The projection type video display according to claim 7, wherein there is further provided a shift device for shifting the write light valve or the writing optical system up and down and/or right and left in a plane perpendicular to an optical axis of image writing.

13. The projection type video display according to claim 7, wherein there is further provided a shift instruction operation portion to which a signal indicating a shift is inputted by an user operation, wherein the driver adjusts the position of the image for each color which is written into the write light valve based on the signal indicating the shift.

* * * * *